United States Patent
Li et al.

(10) Patent No.: US 11,444,726 B2
(45) Date of Patent: Sep. 13, 2022

(54) UPLINK CONTROL INFORMATION TRANSMISSION METHOD AND APPARATUS

(71) Applicant: Huawei Technologies Co., Ltd., Shenzhen (CN)

(72) Inventors: Chaojun Li, Beijing (CN); Hao Sun, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 115 days.

(21) Appl. No.: 16/990,434

(22) Filed: Aug. 11, 2020

(65) Prior Publication Data

US 2020/0374046 A1    Nov. 26, 2020

Related U.S. Application Data

(63) Continuation of application No. PCT/CN2018/076778, filed on Feb. 13, 2018.

(51) Int. Cl.
*H04L 1/18* (2006.01)
*H04L 5/00* (2006.01)
(Continued)

(52) U.S. Cl.
CPC .......... *H04L 1/1819* (2013.01); *H04L 5/0055* (2013.01); *H04L 27/2607* (2013.01); *H04W 72/0413* (2013.01); *H04W 72/1263* (2013.01)

(58) Field of Classification Search
CPC . H04L 1/1819; H04L 5/0055; H04L 27/2607; H04L 1/1812; H04L 1/1861;
(Continued)

(56) References Cited

U.S. PATENT DOCUMENTS

| | | | |
|---|---|---|---|
| 9,585,131 B2 | 2/2017 | Gao et al. | |
| 2015/0055606 A1* | 2/2015 | Yang | H04L 5/001 370/329 |

(Continued)

FOREIGN PATENT DOCUMENTS

| | | |
|---|---|---|
| CN | 107634821 A | 1/2008 |
| CN | 101399646 A | 4/2009 |

(Continued)

OTHER PUBLICATIONS

3GPP TS 36.213 V15.0.0 (Dec. 2017), 14 pages (Year: 2017).*
(Continued)

*Primary Examiner* — Sharmin Chowdhury
(74) *Attorney, Agent, or Firm* — Slater Matsil, LLP

(57) ABSTRACT

An uplink control information transmission method and an apparatus. The method includes determining, by a terminal device, according hybrid automatic repeat request-acknowledgment (HARQ-ACK) information and a mapping relationship, a channel resource corresponding to the HARQ-ACK information, where a channel resource corresponding to an acknowledgement (ACK) and a channel resource corresponding to {ACK, negative acknowledgement (NACK)} in the mapping relationship are the same, generating, by the terminal device, an uplink signal based on the channel resource corresponding to the HARQ-ACK information, and sending, by the terminal device, the uplink signal.

20 Claims, 5 Drawing Sheets

(51) Int. Cl.
*H04L 27/26* (2006.01)
*H04W 72/04* (2009.01)
*H04W 72/12* (2009.01)

(58) Field of Classification Search
CPC ......... H04W 72/0413; H04W 72/1263; H04W 72/00
See application file for complete search history.

(56) References Cited

U.S. PATENT DOCUMENTS

| | | | | |
|---|---|---|---|---|
| 2016/0337110 | A1* | 11/2016 | Yang | H04L 1/1854 |
| 2018/0124824 | A1* | 5/2018 | Lee | H04W 48/16 |
| 2019/0021072 | A1* | 1/2019 | Horiuchi | H04L 5/0055 |
| 2020/0067680 | A1* | 2/2020 | Nayeb Nazar | H04L 5/0055 |

FOREIGN PATENT DOCUMENTS

| | | |
|---|---|---|
| CN | 102098151 A | 6/2011 |
| CN | 102223219 A | 10/2011 |
| CN | 103199961 A | 7/2013 |
| CN | 107666373 A | 2/2018 |
| EP | 2629445 A2 | 8/2013 |
| EP | 2767023 B1 | 8/2017 |
| WO | 2014019541 A1 | 2/2014 |
| WO | 2016167581 A1 | 10/2016 |

OTHER PUBLICATIONS

"On HARQ-ACK and SR Multiplexing on Short-PUCCH," Agenda Item: 7.3.2.1.1, Source: InterDigital Inc., Document for: Discussion and Decision, 3GPP TSG RAN WG1 Meeting 91, R1-1720638, Reno, USA, Nov. 27-Dec. 1, 2017, 8 pages.

Liu, X., "Research on Wireless Packet Scheduling in TD-LTE System," 2011, 87 pages (English Abstract).

Xie, L. et al., "An Optimization on GLRT-Based Detection for LTE PUCCH," IEEE/CIC 2015 Symposium on Communication and Control Theory, 2015, 5 pages.

* cited by examiner

A terminal device determines, based on HARQ-ACK information and a mapping relationship, a channel resource corresponding to the HARQ-ACK information, where a channel resource corresponding to an ACK and a channel resource corresponding to {ACK, NACK} in the mapping relationship are the same — S101

The terminal device generates an uplink signal based on the channel resource corresponding to the HARQ-ACK information — S102

The terminal device sends the uplink signal — S103

FIG. 3

When an SR transmission status is positive SR transmission, a terminal device determines, based on HARQ-ACK information and a first mapping relationship, a channel resource corresponding to the HARQ-ACK information; or when an SR transmission status is negative SR transmission, a channel resource corresponding to the HARQ-ACK information, the terminal device determines, based on HARQ-ACK information and a second mapping relationship — S201

The terminal device generates an uplink signal based on the channel resource corresponding to the HARQ-ACK information — S202

The terminal device sends the uplink signal — S203

FIG. 4

UPLINK CONTROL INFORMATION TRANSMISSION METHOD AND APPARATUS

CROSS-REFERENCE TO RELATED APPLICATIONS

This application is a continuation of International Application No. PCT/CN2018/076778, filed on Feb. 13, 2018, the disclosure of which is hereby incorporated by reference in its entirety.

TECHNICAL FIELD

Embodiments of this application relate to communications technologies, and in particular, to an uplink control information transmission method and an apparatus.

BACKGROUND

In a wireless communications system, a latency is one of important factors that affect user experience. Emerging new services pose higher requirements on the latency. Therefore, in an existing long term evolution (LTE) system, a transmission mechanism based on a transmission time interval (TTI) of one subframe cannot meet a requirement of a low-latency service. To reduce a latency, transmission time periods of a physical downlink shared channel (PDSCH), a physical uplink shared channel (PUSCH), and a physical uplink control channel (PUCCH) need to be shortened from a subframe level to a slot level or even a symbol level.

The PUCCH is used to carry uplink control information (UCI), and the UCI includes at least one of channel state information (CSI), hybrid automatic repeat request-acknowledgment (HARQ-ACK) information, and a scheduling request (SR). After the transmission time period of the PUCCH is shortened to one, two, or three symbols, a PUCCH transmission mechanism based on sequence selection is introduced to enhance performance of receiving a 1-bit or 2-bit HARQ-ACK. In the PUCCH transmission mechanism based on sequence selection, different PUCCH resources correspond to different HARQ-ACK information. For 1-bit HARQ-ACK information, two PUCCH resources are respectively used to indicate two HARQ-ACK states: an acknowledgment (ACK) and a negative acknowledgment (NACK). For 2-bit HARQ-ACK information, four PUCCH resources are respectively used to indicate four states: {ACK, ACK}, {NACK, NACK}, {ACK, NACK}, and {NACK, ACK}. To save reserved PUCCH resources, in an LTE short transmission time interval (sTTI) system, a NACK and {NACK, NACK} correspond to a same PUCCH resource, and an ACK and {NACK, ACK} correspond to a same PUCCH resource.

In the prior art, when a network device sends, to a terminal device, a first PDCCH, a first PDSCH scheduled by using the first PDCCH, a second PDCCH, and a second PDSCH scheduled by using the second PDCCH, because there is a miss detection probability, the terminal device may miss detecting the second PDCCH. When an existing HARQ-ACK feedback mechanism is used, the network device incorrectly decodes HARQ-ACK information fed back by the terminal device, resulting in a failure in receiving the second PDSCH.

Currently, the foregoing problem exists not only in HARQ-ACK information feedback in the LTE system but also in HARQ-ACK information feedback in a new radio (NR) system.

SUMMARY

Embodiments of this application provide an uplink control information transmission method and an apparatus. In this way, a network device can correctly decode HARQ-ACK information fed back by a terminal device, thereby ensuring that the terminal device correctly receives a second PDSCH.

A first aspect of the embodiments of this application provides an uplink control information transmission method, including: determining, by a terminal device based on hybrid automatic repeat request-acknowledgment HARQ-ACK information and a mapping relationship, a channel resource corresponding to the HARQ-ACK information, where a channel resource corresponding to an ACK and a channel resource corresponding to {ACK, NACK} in the mapping relationship are the same, generating, by the terminal device, an uplink signal based on the channel resource corresponding to the HARQ-ACK information, and sending, by the terminal device, the uplink signal.

In the first aspect of the embodiments of this application, the channel resource corresponding to the ACK and the channel resource corresponding to the {ACK, NACK} in the correspondence between the HARQ-ACK information and the channel resource are configured to be the same. When a first PDSCH is correctly received and detection of a second PDCCH is missed, the terminal device sends the uplink signal to a network device based on the channel resource corresponding to the ACK. In this way, the network device can determine the HARQ-ACK information based on the channel resource corresponding to the ACK and a quantity of HARQ-ACK information bits corresponding to the channel resource, and perform processing such as retransmission based on the HARQ-ACK information, thereby ensuring that the terminal device correctly receives a second PDSCH.

In a possible implementation, the channel resource in the mapping relationship includes at least a first physical uplink control channel PUCCH resource and a second PUCCH resource, the mapping relationship includes: the ACK corresponds to the second PUCCH resource, and the {ACK, NACK} corresponds to the second PUCCH resource, and the determining, by a terminal device based on HARQ-ACK information and a mapping relationship, a channel resource corresponding to the HARQ-ACK information includes: when the HARQ-ACK information is the ACK, determining, by the terminal device based on the ACK and the mapping relationship, that the channel resource corresponding to the ACK is the second PUCCH resource, or when the HARQ-ACK information is the {ACK, NACK}, determining, by the terminal device based on the {ACK, NACK} and the mapping relationship, that the channel resource corresponding to the {ACK, NACK} is the second PUCCH resource.

In a possible implementation, the channel resource in the mapping relationship includes at least a first scheduling request SR physical uplink control channel PUCCH resource, a second SR PUCCH resource, a first PUCCH, and a second PUCCH, the mapping relationship includes: the ACK corresponds to the second SR PUCCH resource and the {ACK, NACK} corresponds to the second SR PUCCH resource when an SR transmission status is positive SR transmission, and the ACK corresponds to the second PUCCH resource and the {ACK, NACK} corresponds to the second PUCCH resource when the SR transmission status is negative SR transmission, and the determining, by a terminal device based on HARQ-ACK information and a mapping relationship, a channel resource corresponding to the HARQ-ACK information includes: when the HARQ-ACK information is the ACK and the SR transmission status is positive SR transmission, determining, by the terminal device based on the mapping relationship, that the channel resource corresponding to the ACK is the second SR PUCCH resource, when the HARQ-ACK information is the {ACK, NACK} and the SR transmission status is positive SR transmission, determining, by the terminal device based on the mapping relationship, that the channel resource corresponding to the {ACK, NACK} is the second SR PUCCH resource, when the HARQ-ACK information is the ACK and the SR transmission status is negative SR transmission, determining, by the terminal device based on the mapping relationship, that the channel resource corresponding to the ACK is the second PUCCH resource, or when the HARQ-ACK information is the {ACK, NACK} and the SR transmission status is negative SR transmission, determining, by the terminal device based on the mapping relationship, that the channel resource corresponding to the {ACK, NACK} is the second PUCCH resource.

In a possible implementation, the channel resource corresponding to the HARQ-ACK information is a cyclic shift corresponding to the HARQ-ACK information, and cyclic shifts in the mapping relationship include at least a first cyclic shift and a second cyclic shift, the mapping relationship includes: the ACK corresponds to the second cyclic shift, and the {ACK, NACK} corresponds to the second cyclic shift, and the determining, by a terminal device based on HARQ-ACK information and a mapping relationship, a channel resource corresponding to the HARQ-ACK information includes: when the HARQ-ACK information is the ACK, determining, by the terminal device based on the mapping relationship, that a cyclic shift corresponding to the ACK is the second cyclic shift, or when the HARQ-ACK information is the {ACK, NACK}, determining, by the terminal device based on the mapping relationship, that a cyclic shift corresponding to the {ACK, NACK} is the second cyclic shift.

A second aspect of the embodiments of this application provides an uplink control information transmission method, including: receiving, by a network device, an uplink signal, and determining, by the network device based on a channel resource for the uplink signal, a quantity of hybrid automatic repeat request-acknowledgment HARQ-ACK information bits, and a mapping relationship, HARQ-ACK information corresponding to the channel resource that is for the uplink signal, where a channel resource corresponding to an ACK and a channel resource corresponding to {ACK, NACK} in the mapping relationship are the same.

In the second aspect of the embodiments of this application, the network device configures the channel resource corresponding to the ACK and the channel resource corresponding to the {ACK, NACK} in the correspondence between the HARQ-ACK information and the channel resource to be the same. When a first PDSCH is correctly received and detection of a second PDCCH is missed, a terminal device sends the uplink signal to the network device based on the channel resource corresponding to the ACK. Correspondingly, because the network device sends two PDCCHs to the terminal device, the network device may determine that the quantity of HARQ-ACK information bits corresponding to the channel resource should be 2. In this way, the network device can determine, based on the channel resource corresponding to the ACK and the quantity of HARQ-ACK information bits corresponding to the channel resource, that the HARQ-ACK information corresponding to a channel resource used to feed back the uplink signal by the terminal device is the {ACK, NACK}. That is, the network device can determine that the terminal device successfully receives the first PDSCH but fails to receive a second PDSCH, and further can retransmit the second PDSCH, thereby ensuring that the terminal device can correctly receive the second PDSCH.

In a possible implementation, the quantity of HARQ-ACK information bits is 1 or 2, the channel resource in the mapping relationship includes at least a first physical uplink control channel PUCCH resource and a second PUCCH resource, the mapping relationship includes: the ACK corresponds to the second PUCCH resource, and the {ACK, NACK} corresponds to the second PUCCH resource, and the determining, by the network device based on a channel resource for the uplink signal, a quantity of HARQ-ACK information bits, and a mapping relationship, HARQ-ACK information corresponding to the channel resource that is for the uplink signal includes: when the channel resource for the uplink signal is the second PUCCH resource, and the quantity of HARQ-ACK information bits is 1, determining, by the network device based on the mapping relationship, that the HARQ-ACK information corresponding to the channel resource that is for the uplink signal is the ACK, or when the channel resource for the uplink signal is the second PUCCH resource, and the quantity of HARQ-ACK information bits is 2, determining, by the network device based on the mapping relationship, that the HARQ-ACK information corresponding to the channel resource that is for the uplink signal is the {ACK, NACK}.

In a possible implementation, the quantity of HARQ-ACK information bits is 1 or 2, the channel resource in the mapping relationship includes at least a first scheduling request SR physical uplink control channel PUCCH resource, a second SR PUCCH resource, a first PUCCH, and a second PUCCH, the mapping relationship includes: the ACK corresponds to the second SR PUCCH resource and the {ACK, NACK} corresponds to the second SR PUCCH resource when an SR transmission status is positive SR transmission, and the ACK corresponds to the second PUCCH resource and the {ACK, NACK} corresponds to the second PUCCH resource when the SR transmission status is negative SR transmission, and the determining, by the network device based on a channel resource for the uplink signal, a quantity of HARQ-ACK information bits, and a mapping relationship, HARQ-ACK information corresponding to the channel resource that is for the uplink signal includes: when the channel resource for the uplink signal is the second SR PUCCH resource, and the quantity of HARQ-ACK information bits is 1, determining, by the network device based on the mapping relationship, that the HARQ-ACK information corresponding to the channel resource that is for the uplink signal is the ACK and the SR transmission status is positive SR transmission, when the channel resource for the uplink signal is the second SR PUCCH resource, and the quantity of HARQ-ACK information bits is 2, determining, by the network device based on the mapping relationship, that the HARQ-ACK information corresponding to the channel resource that is for the uplink signal is the {ACK, NACK} and the SR transmission status is positive SR transmission, when the channel resource used for the uplink signal is the second PUCCH resource, and the quantity of HARQ-ACK information bits is 1, determining, by the network device based on the mapping relationship, that the HARQ-ACK information corresponding to the channel resource used for the uplink signal is the ACK and the SR transmission status is negative SR transmission, or when the channel resource used for the uplink signal is the second PUCCH resource, and the quantity of HARQ-ACK information bits is 2, determining, by the network device based on the mapping relationship, that the HARQ-ACK information corresponding to the channel resource that is for the uplink signal is the {ACK, NACK} and the SR transmission status is negative SR transmission.

In a possible implementation, the channel resource corresponding to the HARQ-ACK information is a cyclic shift corresponding to the HARQ-ACK information, and cyclic shifts in the mapping relationship include at least a first cyclic shift and a second cyclic shift, the mapping relationship includes: the ACK corresponds to the second cyclic shift, and the {ACK, NACK} corresponds to the second cyclic shift, and the determining, by the network device based on a channel resource for the uplink signal, a quantity of HARQ-ACK information bits, and a mapping relationship, HARQ-ACK information corresponding to the channel resource that is for the uplink signal includes: when a cyclic shift for the uplink signal is the second cyclic shift and the quantity of HARQ-ACK information bits is 1, determining, by the network device based on the mapping relationship, that HARQ-ACK information corresponding to the cyclic shift for the uplink signal is the ACK, or when a cyclic shift for the uplink signal is the second cyclic shift and the quantity of HARQ-ACK information bits is 2, determining, by the network device based on the mapping relationship, that HARQ-ACK information corresponding to the cyclic shift for the uplink signal is the {ACK, NACK}, where 1 indicates that the HARQ-ACK information is an ACK, and 0 indicates that the HARQ-ACK information is a NACK.

A third aspect of the embodiments of this application provides an uplink control information transmission method, including: when an SR transmission status is negative SR transmission, determining, by a terminal device based on HARQ-ACK information and a first mapping relationship, a channel resource corresponding to the HARQ-ACK information, where the HARQ-ACK information includes an ACK, {ACK, NACK}, a NACK, or {NACK, NACK}, and the first mapping relationship includes a correspondence that is between the HARQ-ACK information and the channel resource and that exists when the SR transmission status is negative SR transmission, or when an SR transmission status is positive SR transmission, determining, by the terminal device based on HARQ-ACK information and a second mapping relationship, a channel resource corresponding to the HARQ-ACK information, where the second mapping relationship includes a correspondence that is between the HARQ-ACK information and the channel resource and that exists when the SR transmission status is positive SR transmission, a channel resource corresponding to a NACK in the second mapping relationship is the same as a channel resource corresponding to {NACK, NACK} in the first mapping relationship, and a channel resource corresponding to an ACK in the second mapping relationship is the same as a channel resource corresponding to {ACK, NACK} in the first mapping relationship, generating, by the terminal device, an uplink signal based on the channel resource corresponding to the HARQ-ACK information, and sending, by the terminal device, the uplink signal.

In the third aspect of the embodiments of this application, the channel resource corresponding to the NACK in the second mapping relationship and the channel resource corresponding to the {NACK, NACK} in the first mapping relationship are configured to be the same, and the channel resource corresponding to the ACK in the second mapping relationship and the channel resource corresponding to the {ACK, NACK} in the first mapping relationship are configured to be the same. When a first PDCCH is correctly received and detection of a second PDCCH is missed, the terminal device sends the uplink signal to a network device based on the channel resource corresponding to the ACK. In this way, the network device determines the HARQ-ACK information based on the channel resource corresponding to the ACK and a quantity of HARQ-ACK information bits corresponding to the channel resource, and performs processing such as retransmission based on the HARQ-ACK information, thereby ensuring that the terminal device correctly receives a second PDSCH. In addition, according to the method, no new PUCCH resource needs to be reserved for an SR, and compared with an LTE system, a system using the method reduces PUCCH resource overheads.

In a possible implementation, an ACK and the {ACK, NACK} in the first mapping relationship correspond to a same channel resource.

In a possible implementation, the channel resource corresponding to the HARQ-ACK information is a cyclic shift corresponding to the HARQ-ACK information, and cyclic shifts in the second mapping relationship include at least a first cyclic shift and a second cyclic shift, the second mapping relationship includes: the NACK corresponds to the first cyclic shift, and the ACK corresponds to the second cyclic shift, and the determining, by the terminal device based on HARQ-ACK information and a second mapping relationship, a channel resource corresponding to the HARQ-ACK information includes: when the HARQ-ACK information is the NACK and the SR transmission status is positive SR transmission, determining, by the terminal device based on the second mapping relationship, that a cyclic shift corresponding to the NACK is the first cyclic shift, or when the HARQ-ACK information is the ACK and the SR transmission status is positive SR transmission, determining, by the terminal device based on the second mapping relationship, that a cyclic shift corresponding to the ACK is the second cyclic shift.

In a possible implementation, cyclic shifts in the first mapping relationship include at least the first cyclic shift and the second cyclic shift, the first mapping relationship includes: the ACK corresponds to the second cyclic shift, and the {ACK, NACK} corresponds to the second cyclic shift, and the determining, by a terminal device based on HARQ-ACK information and a first mapping relationship, a channel resource corresponding to the HARQ-ACK information includes: when the HARQ-ACK information is the NACK, determining, by the terminal device based on the first mapping relationship, that a cyclic shift corresponding to the NACK is the first cyclic shift, when the HARQ-ACK information is the ACK, determining, by the terminal device based on the first mapping relationship, that a cyclic shift corresponding to the ACK is the second cyclic shift, when the HARQ-ACK information is the {NACK, NACK}, determining, by the terminal device based on the first mapping relationship, that a cyclic shift corresponding to the {NACK, NACK} is the first cyclic shift, or when the HARQ-ACK information is the {ACK, NACK}, determining, by the terminal device based on the first mapping relationship, that a cyclic shift corresponding to the {ACK, NACK} is the second cyclic shift.

A fourth aspect of this application provides an uplink control information transmission method, including: modulating, by a terminal device, HARQ-ACK information into a complex-valued symbol according to a modulation rule, where a complex-valued symbol corresponding to an ACK and a complex-valued symbol corresponding to {ACK, NACK} in the modulation rule are the same, generating, by the terminal device, an uplink signal based on the complex-valued symbol corresponding to the HARQ-ACK information, and sending, by the terminal device, the uplink signal.

In the fourth aspect of the embodiments of this application, the complex-valued symbol corresponding to the ACK and the complex-valued symbol corresponding to the {ACK, NACK} in the modulation rule are configured to be the same. When a first PDCCH is correctly received and detection of a second PDCCH is missed, the terminal device sends the complex-valued symbol corresponding to the ACK to a network device. Correspondingly, the network device determines the HARQ-ACK information based on the complex-valued symbol corresponding to the ACK and a quantity of HARQ-ACK information bits corresponding to the complex-valued symbol, and performs processing such as retransmission based on the HARQ-ACK information, thereby ensuring that the terminal device correctly receives a second PDSCH.

A fifth aspect of this application provides an uplink control information transmission method, including: receiving, by a network device, an uplink signal, and determining, by the network device based on a complex-valued symbol carried in the uplink signal, a quantity of HARQ-ACK information bits, and a modulation rule, HARQ-ACK information corresponding to the complex-valued symbol carried in the uplink signal, where a complex-valued symbol corresponding to an ACK and a complex-valued symbol corresponding to {ACK, NACK} in the modulation rule are the same.

In the fourth aspect of the embodiments of this application, the complex-valued symbol corresponding to the ACK and the complex-valued symbol corresponding to the {ACK, NACK} in the modulation rule are configured to be the same. When a first PDCCH is correctly received and detection of a second PDCCH is missed, a terminal device sends the complex-valued symbol corresponding to the ACK to the network device. Correspondingly, because the network device sends two PDCCHs to the terminal device, the network device can determine that the quantity of HARQ-ACK information bits corresponding to the complex-valued symbol is 2. In this way, the network device can determine the HARQ-ACK information based on the complex-valued symbol corresponding to the ACK and the quantity of HARQ-ACK information bits corresponding to the complex-valued symbol, and perform processing such as retransmission based on the HARQ-ACK information, thereby ensuring that the terminal device correctly receives a second PDSCH.

A sixth aspect of this application provides a communications device, including: a processor, configured to determine, based on hybrid automatic repeat request-acknowledgment HARQ-ACK information and a mapping relationship, a channel resource corresponding to the HARQ-ACK information, where a channel resource corresponding to an ACK and a channel resource corresponding to {ACK, NACK} in the mapping relationship are the same, where the processor is further configured to generate an uplink signal based on the channel resource corresponding to the HARQ-ACK information, and a transmitter, configured to send the uplink signal.

In a possible implementation, the channel resource in the mapping relationship includes at least a first physical uplink control channel PUCCH resource and a second PUCCH resource, the mapping relationship includes: the ACK corresponds to the second PUCCH resource, and the {ACK, NACK} corresponds to the second PUCCH resource, and the processor is specifically configured to: when the HARQ-ACK information is the ACK, determine, based on the ACK and the mapping relationship, that the channel resource corresponding to the ACK is the second PUCCH resource, or when the HARQ-ACK information is the {ACK, NACK}, determine, based on the {ACK, NACK} and the mapping relationship, that the channel resource corresponding to the {ACK, NACK} is the second PUCCH resource.

In a possible implementation, the channel resource in the mapping relationship includes at least a first scheduling request SR physical uplink control channel PUCCH resource, a second SR PUCCH resource, a first PUCCH, and a second PUCCH, the mapping relationship includes: the ACK corresponds to the second SR PUCCH resource and the {ACK, NACK} corresponds to the second SR PUCCH resource when an SR transmission status is positive SR transmission, and the ACK corresponds to the second PUCCH resource and the {ACK, NACK} corresponds to the second PUCCH resource when the SR transmission status is negative SR transmission, and the processor is specifically configured to: when the HARQ-ACK information is the ACK and the SR transmission status is positive SR transmission, determine, based on the mapping relationship, that the channel resource corresponding to the ACK is the second SR PUCCH resource, when the HARQ-ACK information is the {ACK, NACK} and the SR transmission status is positive SR transmission, determine, based on the mapping relationship, that the channel resource corresponding to the {ACK, NACK} is the second SR PUCCH resource, when the HARQ-ACK information is the ACK and the SR transmission status is negative SR transmission, determine, based on the mapping relationship, that the channel resource corresponding to the ACK is the second PUCCH resource, or when the HARQ-ACK information is the {ACK, NACK} and the SR transmission status is negative SR transmission, determine, based on the mapping relationship, that the channel resource corresponding to the {ACK, NACK} is the second PUCCH resource.

In a possible implementation, the channel resource corresponding to the HARQ-ACK information is a cyclic shift corresponding to the HARQ-ACK information, and cyclic shifts in the mapping relationship include at least a first cyclic shift and a second cyclic shift, the mapping relationship includes: the ACK corresponds to the second cyclic shift, and the {ACK, NACK} corresponds to the second cyclic shift, and the processor is specifically configured to: when the HARQ-ACK information is the ACK, determine, based on the mapping relationship, that a cyclic shift corresponding to the ACK is the second cyclic shift, or when the HARQ-ACK information is the {ACK, NACK}, determine, based on the mapping relationship, that a cyclic shift corresponding to the {ACK, NACK} is the second cyclic shift.

A seventh aspect of this application provides a network device, including: a receiver, configured to receive an uplink signal, and a processor, configured to determine, based on a channel resource for the uplink signal, a quantity of hybrid automatic repeat request-acknowledgment HARQ-ACK information bits, and a mapping relationship, HARQ-ACK information corresponding to the channel resource that is for the uplink signal, where a channel resource corresponding to an ACK and a channel resource corresponding to {ACK, NACK} in the mapping relationship are the same.

In a possible implementation, the quantity of HARQ-ACK information bits is 1 or 2, the channel resource in the mapping relationship includes at least a first physical uplink control channel PUCCH resource and a second PUCCH resource, the mapping relationship includes: the ACK corresponds to the second PUCCH resource, and the {ACK, NACK} corresponds to the second PUCCH resource, and the processor is specifically configured to: when the channel resource for the uplink signal is the second PUCCH resource, and the quantity of HARQ-ACK information bits is 1, determine, based on the mapping relationship, that the HARQ-ACK information corresponding to the channel resource that is for the uplink signal is the ACK, or when the channel resource for the uplink signal is the second PUCCH resource, and the quantity of HARQ-ACK information bits is 2, determine, based on the mapping relationship, that the HARQ-ACK information corresponding to the channel resource that is for the uplink signal is the {ACK, NACK}.

In a possible implementation, the quantity of HARQ-ACK information bits is 1 or 2, the channel resource in the mapping relationship includes at least a first scheduling request SR physical uplink control channel PUCCH resource, a second SR PUCCH resource, a first PUCCH, and a second PUCCH, the mapping relationship includes: the ACK corresponds to the second SR PUCCH resource and the {ACK, NACK} corresponds to the second SR PUCCH resource when an SR transmission status is positive SR transmission, and the ACK corresponds to the second PUCCH resource and the {ACK, NACK} corresponds to the second PUCCH resource when the SR transmission status is negative SR transmission, and the processor is specifically configured to: when the channel resource for the uplink signal is the second SR PUCCH resource, and the quantity of HARQ-ACK information bits is 1, determine, based on the mapping relationship, that the HARQ-ACK information corresponding to the channel resource that is for the uplink signal is the ACK and the SR transmission status is positive SR transmission, when the channel resource for the uplink signal is the second SR PUCCH resource, and the quantity of HARQ-ACK information bits is 2, determine, based on the mapping relationship, that the HARQ-ACK information corresponding to the channel resource that is for the uplink signal is the {ACK, NACK} and the SR transmission status is positive SR transmission, when the channel resource used for the uplink signal is the second PUCCH resource, and the quantity of HARQ-ACK information bits is 1, determine, based on the mapping relationship, that the HARQ-ACK information corresponding to the channel resource used for the uplink signal is the ACK and the SR transmission status is negative SR transmission, or when the channel resource used for the uplink signal is the second PUCCH resource, and the quantity of HARQ-ACK information bits is 2, determine, based on the mapping relationship, that the HARQ-ACK information corresponding to the channel resource that is for the uplink signal is the {ACK, NACK} and the SR transmission status is negative SR transmission.

In a possible implementation, the channel resource corresponding to the HARQ-ACK information is a cyclic shift corresponding to the HARQ-ACK information, and cyclic shifts in the mapping relationship include at least a first cyclic shift and a second cyclic shift, the mapping relationship includes: the ACK corresponds to the second cyclic shift, and the {ACK, NACK} corresponds to the second cyclic shift, and the processor is specifically configured to: when a cyclic shift for the uplink signal is the second cyclic shift and the quantity of HARQ-ACK information bits is 1, determine, based on the mapping relationship, that HARQ-ACK information corresponding to the cyclic shift for the uplink signal is the ACK, or when a cyclic shift for the uplink signal is the second cyclic shift and the quantity of HARQ-ACK information bits is 2, determine, based on the mapping relationship, that HARQ-ACK information corresponding to the cyclic shift for the uplink signal is the {ACK, NACK}.

An eighth aspect of the embodiments of this application provides a communications device, including a processor and a transmitter, where the processor is configured to: when an SR transmission status is negative SR transmission, determine, based on HARQ-ACK information and a first mapping relationship, a channel resource corresponding to the HARQ-ACK information, where the first mapping relationship includes a correspondence that is between the HARQ-ACK information and the channel resource and that exists when the SR transmission status is negative SR transmission, or when an SR transmission status is positive SR transmission, determine, based on HARQ-ACK information and a second mapping relationship, a channel resource corresponding to the HARQ-ACK information, where the second mapping relationship includes a correspondence that is between the HARQ-ACK information and the channel resource and that exists when the SR transmission status is positive SR transmission, a channel resource corresponding to a NACK in the second mapping relationship is the same as a channel resource corresponding to {NACK, NACK} in the first mapping relationship, and a channel resource corresponding to an ACK in the second mapping relationship is the same as a channel resource corresponding to {ACK, NACK} in the first mapping relationship, and generate an uplink signal based on the channel resource corresponding to the HARQ-ACK information, and the transmitter is configured to send the uplink signal.

In a possible implementation, an ACK and the {ACK, NACK} in the first mapping relationship correspond to a same channel resource.

In a possible implementation, the channel resource corresponding to the HARQ-ACK information is a cyclic shift corresponding to the HARQ-ACK information, and cyclic shifts in the second mapping relationship include at least a first cyclic shift and a second cyclic shift, the second mapping relationship includes: the NACK corresponds to the first cyclic shift, and the ACK corresponds to the second cyclic shift, and the processor is specifically configured to: when the HARQ-ACK information is the NACK and the SR transmission status is positive SR transmission, determine, based on the second mapping relationship, that a cyclic shift corresponding to the NACK is the first cyclic shift, or when the HARQ-ACK information is the ACK and the SR transmission status is positive SR transmission, determine, based on the second mapping relationship, that a cyclic shift corresponding to the ACK is the second cyclic shift.

In a possible implementation, cyclic shifts in the first mapping relationship include at least the first cyclic shift and the second cyclic shift, the first mapping relationship includes: the ACK corresponds to the second cyclic shift, and the {ACK, NACK} corresponds to the second cyclic shift, and the processor is specifically configured to: when the HARQ-ACK information is the NACK, determine, based on the first mapping relationship, that a cyclic shift corresponding to the NACK is the first cyclic shift, when the HARQ-ACK information is the ACK, determine, based on the first mapping relationship, that a cyclic shift corresponding to the ACK is the second cyclic shift, when the HARQ-ACK information is the {NACK, NACK}, determine, based on the first mapping relationship, that a cyclic shift corresponding to the {NACK, NACK} is the first cyclic shift, or when the HARQ-ACK information is the {ACK, NACK}, determine, based on the first mapping relationship, that a cyclic shift corresponding to the {ACK, NACK} is the second cyclic shift.

A ninth aspect of this application provides a communications device, including: a processor, configured to modulate HARQ-ACK information into a complex-valued symbol according to a modulation rule, where a complex-valued symbol corresponding to an ACK and a complex-valued symbol corresponding to {ACK, NACK} in the modulation rule are the same, where the processor is further configured to generate an uplink signal based on the complex-valued symbol corresponding to the HARQ-ACK information, and a transmitter, configured to send the uplink signal.

A tenth aspect of this application provides a network device, including: a receiver, configured to receive an uplink signal, and a processor, configured to determine, based on a complex-valued symbol carried in the uplink signal, a quantity of HARQ-ACK information bits, and a modulation rule, HARQ-ACK information corresponding to the complex-valued symbol carried in the uplink signal, where a complex-valued symbol corresponding to an ACK and a complex-valued symbol corresponding to {ACK, NACK} in the modulation rule are the same.

Optionally, in the foregoing embodiments, the processor may be a processing unit, the transmitter may be a sending unit, and the receiver may be a receiving unit.

In the first aspect, the second aspect, the sixth aspect, and the seventh aspect of the embodiments of this application, in a possible implementation, the mapping relationship meets Table 1 to Table 3:

TABLE 1

| sPUCCH format | HARQ-ACK information | PUCCH resource |
|---|---|---|
| 1a | 0 | First PUCCH resource |
|  | 1 | Second PUCCH resource |
| 1b | 00 | First PUCCH resource |
|  | 10 | Second PUCCH resource |
|  | 01 | Third PUCCH resource |
|  | 11 | Fourth PUCCH resource |

TABLE 2

| HARQ-ACK information | SR transmission status | PUCCH resource |
|---|---|---|
| ACK/NACK | Negative | PUCCH resource corresponding to the sPUCCH format 1a in Table 1 |
| NACK | Positive | First SR PUCCH resource |
| ACK | Positive | Second SR PUCCH resource |

TABLE 3

| HARQ-ACK information (0) | HARQ-ACK information (1) | SR transmission status | PUCCH resource |
|---|---|---|---|
| ACK/NACK | ACK/NACK | Negative | PUCCH resource corresponding to the sPUCCH format 1b in Table 1 |
| NACK | NACK | Positive | First SR PUCCH resource |
| ACK | NACK | Positive | Second SR PUCCH resource |
| NACK | ACK | Positive | Third SR PUCCH resource |
| ACK | ACK | Positive | Fourth SR PUCCH resource | where 1 indicates that the HARQ-ACK information is an ACK, and 0 indicates that the HARQ-ACK information is a NACK, where when the SR transmission status is negative SR transmission, the correspondence between the HARQ-ACK information and the channel resource meets Table 1, when the SR transmission status is positive SR transmission, the correspondence between the HARQ-ACK information and the channel resource meets Table 2 and Table 3.

In the first aspect, the second aspect, the sixth aspect, and the seventh aspect of the embodiments of this application, in a possible implementation, the mapping relationship is a mapping relationship 1 or a mapping relationship 2, where the mapping relationship 1 meets Table 4 and Table 5, and the mapping relationship 2 meets Table 6 and Table 7:

TABLE 4

|  | HARQ-ACK information | |
|---|---|---|
|  | 0 | 1 |
| Cyclic shift | $m_{CS} = 0$ | $m_{CS} = 6$ |

TABLE 5

|  | HARQ-ACK information | | | |
|---|---|---|---|---|
|  | 1 | {0, 1} | {1, 0} | {1, 1} |
| Cyclic shift | $m_{CS} = 0$ | $m_{CS} = 3$ | $m_{CS} = 6$ | $m_{CS} = 9$ |

TABLE 6

|  | HARQ-ACK information | |
|---|---|---|
|  | 1 | 1 |
| Cyclic shift | $m_{CS} = 0$ | $m_{CS} = 9$ |

TABLE 7

|  | HARQ-ACK information | | | |
|---|---|---|---|---|
|  | 1 | {0, 1} | {1, 1} | {1, 0} |
| Cyclic shift | $m_{CS} = 0$ | $m_{CS} = 3$ | $m_{CS} = 6$ | $m_{CS} = 9$ |

Correspondingly, before the receiving the uplink signal, the network device sends indication information to the terminal device, where the indication information indicates that the mapping relationship is the mapping relationship 1 or the mapping relationship 2. The terminal device receives the indication information sent by the network device.

In the fourth aspect, the fifth aspect, the ninth aspect, and the tenth aspect of the embodiments of this application, in a possible implementation, a complex-valued symbol corresponding to a NACK and a complex-valued symbol corresponding to {NACK, NACK} in the modulation rule are the same.

In the fourth aspect, the fifth aspect, the ninth aspect, and the tenth aspect of the embodiments of this application, in a possible implementation, the modulation rule includes:

the complex-valued symbol corresponding to the NACK is $$x = \frac{1}{\sqrt{2}}[1+j];$$

the complex-valued symbol corresponding to the ACK is $$x = \frac{1}{\sqrt{2}}[-1-j];$$

and
the complex-valued symbol corresponding to the {NACK, NACK} is $$x = \frac{1}{\sqrt{2}}[1+j],$$

and the complex-valued symbol corresponding to the {ACK, NACK} is $$x = \frac{1}{\sqrt{2}}[-1-j].$$

In another possible implementation, the modulation rule includes:

a complex-valued symbol corresponding to {NACK, ACK} is $$x = \frac{1}{\sqrt{2}}[1-j];$$

and
a complex-valued symbol corresponding to {ACK, ACK} is $$x = \frac{1}{\sqrt{2}}[-1+j];$$

or
the modulation rule includes: a complex-valued symbol corresponding to {NACK, ACK} is $$x = \frac{1}{\sqrt{2}}[-1+j];$$

and
a complex-valued symbol corresponding to {ACK, ACK} is $$x = \frac{1}{\sqrt{2}}[1-j].$$

An eleventh aspect of the embodiments of this application provides a computer-readable storage medium, where the computer-readable storage medium stores an instruction, and when the instruction is executed, a computer is enabled to perform the uplink control information transmission method according to any one of the first aspect, the third aspect, or the fourth aspect of the embodiments of this application.

A twelfth aspect of the embodiments of this application provides a computer-readable storage medium, where the computer-readable storage medium stores an instruction, and when the instruction is executed, a computer is enabled to perform the uplink control information transmission method according to either the second aspect or the fifth aspect of the embodiments of this application.

A thirteenth aspect of the embodiments of this application provides a computer program product, where the computer program product includes an instruction, and when the instruction is executed, a computer is enabled to perform the uplink control information transmission method according to any one of the first aspect, the third aspect, or the fourth aspect of this application.

A fourteenth aspect of the embodiments of this application provides a computer program product, where the computer program product includes an instruction, and when the instruction is executed, a computer is enabled to perform the uplink control information transmission method according to either the second aspect or the fifth aspect of this application.

A fifteenth aspect of the embodiments of this application provides a chip, where the chip stores a computer program, and when the computer program is executed by a processor, the uplink control information transmission method according to any one of the first aspect, the third aspect, or the fourth aspect is performed.

A sixteenth aspect of the embodiments of this application provides a chip, where the chip stores a computer program, and when the computer program is executed by a processor, the uplink control information transmission method according to either the second aspect or the fifth aspect is performed.

A seventeenth aspect of the embodiments of this application provides a communications system, where the communications system includes the communications device according to any one of the sixth aspect, the eighth aspect, or the ninth aspect and the network device according to either the seventh aspect or the tenth aspect.

According to the uplink control information transmission method and the apparatus that are provided in the embodiments of this application, the terminal device determines, based on the HARQ-ACK information and the mapping relationship, the channel resource corresponding to the HARQ-ACK information, where the channel resource corresponding to the ACK and the channel resource corresponding to the {ACK, NACK} in the mapping relationship are the same. The terminal device generates the uplink signal based on the channel resource corresponding to the HARQ-ACK information, and sends the uplink signal. The channel resource corresponding to the ACK and the channel resource corresponding to the {ACK, NACK} are the same. Therefore, when a first PDSCH is correctly received and detection of a second PDCCH is missed, the terminal device sends the uplink signal to the network device based on the channel resource corresponding to the ACK. Correspondingly, because the network device sends two PDCCHs to the terminal device, the network device may determine that the quantity of HARQ-ACK information bits corresponding to the channel resource is 2. In this way, the network device can determine, based on the channel resource corresponding to the ACK and the quantity of HARQ-ACK information bits corresponding to the channel resource, that the HARQ-ACK information corresponding to a channel resource used to feed back the uplink signal by the terminal device is the {ACK, NACK}. That is, the network device can determine that the terminal device successfully receives the first PDSCH but fails to receive a second PDSCH, and further can retransmit the second PDSCH, thereby ensuring that the terminal device can correctly receive the second PDSCH.

BRIEF DESCRIPTION OF THE DRAWINGS

FIG. 3 is a flowchart of an uplink control information transmission method according to Embodiment 1 of this application;

FIG. 4 is a flowchart of an uplink control information transmission method according to Embodiment 2 of this application;

DETAILED DESCRIPTION OF ILLUSTRATIVE EMBODIMENTS

Embodiments of this application provide an uplink control information transmission method. The method in the embodiments of this application may be applied to a long term evolution system (LTE) system, or may be applied to a fifth generation (5G) system. The 5G system is also referred to as a new wireless communications system, a new radio (NR) system, or a next-generation mobile communications system.

Figure 1:
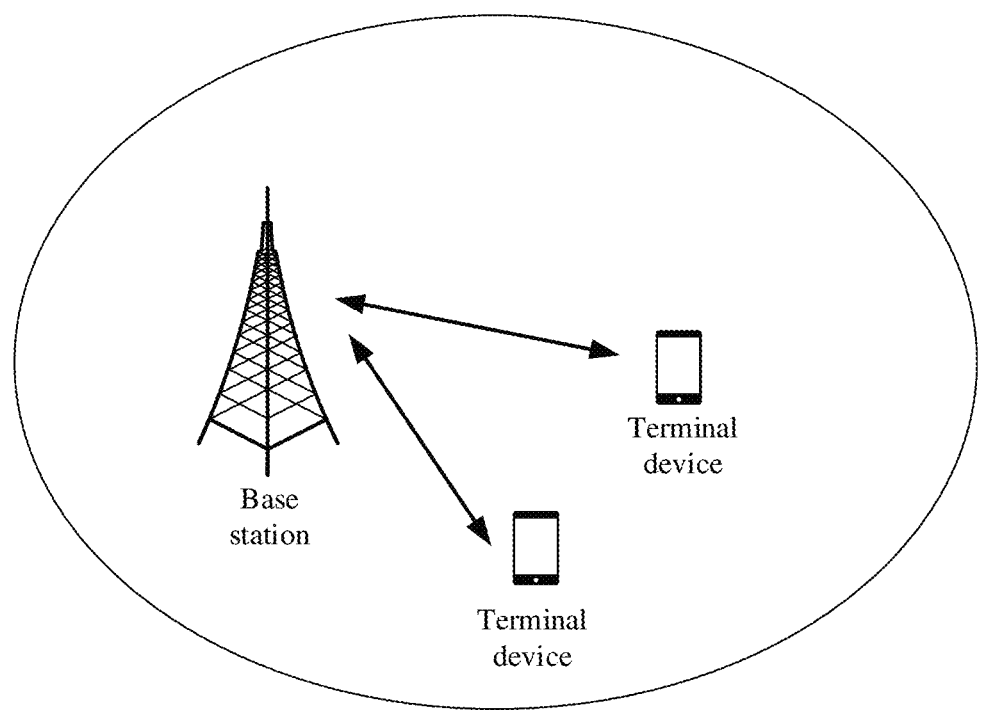
FIG. 1 is a schematic diagram of a network architecture to which embodiments of this application are applicable.

FIG. 1 is a schematic diagram of a network architecture to which the embodiments of this application are applicable. As shown in FIG. 1, the network architecture includes a terminal device and a radio access network (RAN) device. A quantity of terminal devices is not limited. The RAN device may be a RAN device in a 5G system. The RAN device in the 5G system may include a plurality of 5G-RAN nodes, and the 5G-RAN nodes may include an access point (AP) in a non-3rd generation partnership project (3GPP) access network such as a wireless fidelity (Wi-Fi) network and next-generation base stations (which may be collectively referred to as a next-generation radio access network node (NG-RAN node)). The next-generation base stations include a new radio NodeB (NR NodeB, gNB), a next-generation evolved NodeB (NG-eNB), a transmission receive point (TRP), a transmission point (TP), or another node. The network device may alternatively be an evolved NodeB (evolved NodeB, eNB), an AP, or a relay station in an LTE system.

Figure 2:
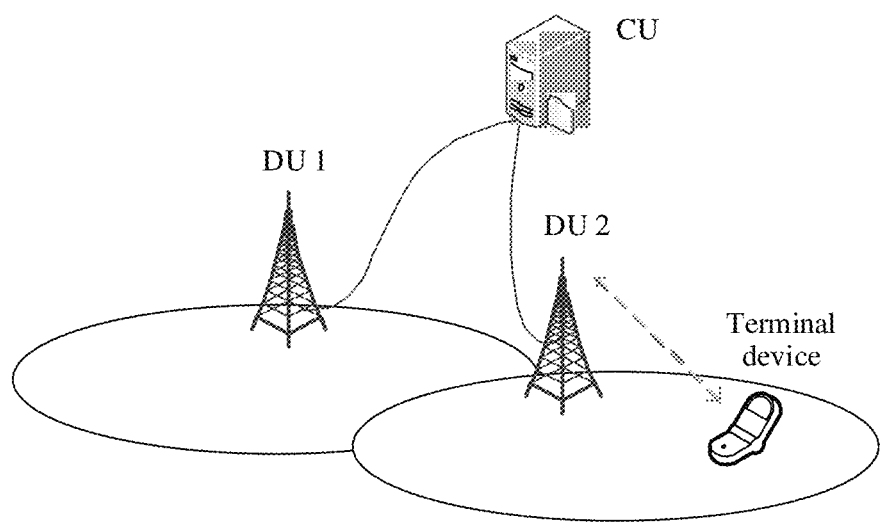
FIG. 2 is a schematic diagram of another network architecture to which this application is applicable.

FIG. 2 is a schematic diagram of another network architecture to which the embodiments of this application are applicable. As shown in FIG. 2, the (RAN) device in the 5G system may alternatively be a gNB in which a central unit (CU) is separated from a distributed unit (DU). One CU may control a plurality of DUs, and a terminal device accesses a network by using the DU.

The terminal device may be a mobile phone or a computer, or may be a cellular phone, a cordless phone, a session initiation protocol (SIP) phone, a smartphone, a wireless local loop (WLL) station, a personal digital assistant (PDA), a computer, a laptop computer, a handheld communications device, a handheld computing device, a satellite radio device, a wireless modem card, a television set-top box (STB), a vehicle-mounted device, a wearable device, a smart home device, another device configured to perform communication in a wireless system, or the like.

The following briefly describes some concepts used in the embodiments of this application.

1. Transmission Duration

In the embodiments of this application, a time domain resource may be identified by using a transmission duration. One transmission duration includes N symbols, where N is a positive integer. In the embodiments of this application, a time length of the transmission duration is not limited, that is, a value of N is not limited. For example, one transmission duration may be one subframe, one slot, one mini-slot, one subslot, or one short transmission duration (STD)/short transmission time interval (sTTI).

In an LTE system, one slot includes six or seven symbols. One subframe is 1 ms (millisecond), and includes 12 or 14 symbols. In an NR system, one slot includes 12 or 14 symbols. In the NR system, one subframe is 1 ms, and may include one, two, four, eight, 16, or 32 slots. One subslot includes two or three symbols, and one segment of STD or one sTTI includes two, three, or seven symbols.

A time length of a symbol is not limited in the embodiments of this application. For example, one symbol may have different lengths for different subcarrier spacings. Without loss of generality, symbols include an uplink symbol and a downlink symbol. The uplink symbol may be referred to as a single-carrier frequency division multiple access (SC-FDMA) symbol or an orthogonal frequency division multiplexing (OFDM) symbol, and the downlink symbol may be referred to as an OFDM symbol. It should be noted that, if a new uplink multiple access scheme or downlink multiple access scheme is introduced to a subsequent technology, the term "symbol" may still be used. The uplink multiple access scheme and the downlink multiple access scheme are not limited in this application.

2. HARQ-ACK Information

The HARQ-ACK information may also be referred to as HARQ-ACK feedback information. The HARQ-ACK information is used to indicate a reception status of downlink data. To be specific, a value of a bit in the HARQ-ACK information is used to indicate the reception status of the downlink data. The reception status of the downlink data includes an acknowledgment (ACK) and a negative acknowledgment (NACK). The ACK indicates that the downlink data is successfully received, and the NACK indicates that the downlink data fails to be received. Optionally, the reception status of the downlink data further includes discontinuous transmission (DTX), and the DTX indicates that the downlink data is not received.

Optionally, the downlink data is data carried on a PDSCH. Therefore, the reception status of the downlink data may also be considered as a reception status of the PDSCH.

Optionally, the downlink data is semi-persistent scheduling (SPS) release signaling. Therefore, the reception status of the downlink data may also be considered as a reception status of the SPS release signaling. When the terminal device detects a PDCCH carrying the SPS release signaling, the reception status of the SPS release signaling is an ACK, otherwise, the reception status of the SPS release signaling is DTX.

3. Scheduling Request (SR) Transmission Status

In the embodiments of this application, the SR transmission status includes positive SR transmission and negative SR transmission. The positive SR transmission means that the terminal device needs to send an SR to the network device, and the negative SR transmission means that the terminal device does not need to send an SR to the network device. As a network evolves, the SR transmission status may include more states. When the SR transmission status of the terminal device is positive SR transmission, the terminal device sends an uplink signal carrying an SR to the network device. When the SR transmission status of the terminal device is negative SR transmission, the terminal device sends an uplink signal carrying no SR to the network device.

The terminal device applies, by sending a positive SR, to the network device for an uplink resource, for subsequent uplink data transmission. Therefore, when the terminal device needs to initiate uplink transmission and there is no uplink resource (or there is no sufficient uplink resource), the terminal device sends a positive SR. When the terminal device does not need to initiate uplink transmission or currently there is an uplink resource (or there are sufficient uplink resources), the terminal device does not need to send a positive SR. In other words, the SR transmission status is negative SR transmission.

4. PUCCH based on Sequence Selection

For the PUCCH based on sequence selection, different HARQ-ACK information (or different downlink data reception statuses) is represented by using different PUCCH resources.

Optionally, the PUCCH resource may be identified by using a cyclic shift (CS). Therefore, it may also be considered that a channel resource is a cyclic shift. In this way, for the PUCCH based on sequence selection, different HARQ-ACK information is indicated by using different cyclic shifts, where the cyclic shift may also be referred to as a sequence cyclic shift.

Optionally, the PUCCH resource is identified by using at least one of a CS and a resource block (RB). In this way, for the PUCCH based on sequence selection, different HARQ-ACK information is indicated by using different cyclic shifts and/or different RBs.

Optionally, the PUCCH resource is identified by at least one of a CS, an orthogonal sequence, and an RB. In this way, for the PUCCH based on sequence selection, different HARQ-ACK information is indicated by using different cyclic shifts, different orthogonal sequences, and/or different RBs.

It should be noted that, to effectively use resources, a plurality of terminal devices may send respective PUCCHs on a same RB. In other words, there may be a plurality of PUCCH resources on one RB. A plurality of PUCCHs on one RB may be implemented through orthogonal code division multiplexing (CDM): A cyclic shift is used in frequency domain, or an orthogonal sequence is used in time domain, or a cyclic shift is used in frequency domain and an orthogonal sequence is used in time domain, where the cyclic shift is also referred to as phase rotation.

5. PUCCH Based on a Demodulation Reference Signal (DMRS)

A PUCCH format 1 is used to transmit 1-bit or 2-bit HARQ-ACK information, and is a DMRS-based PUCCH format. For 1-bit HARQ-ACK information, for example, binary '1' indicates an ACK, and binary '0' indicates a NACK. The 1-bit HARQ-ACK information is modulated into a complex-valued symbol (complex-valued symbol) through binary phase shift keying (binary phase shift keying, BPSK). For 2-bit HARQ-ACK information, for example, binary (binary) '11' indicates (ACK, ACK), binary '00' indicates (NACK, NACK), binary (binary) '10' indicates (ACK, NACK), and binary (binary) '01' indicates (NACK, ACK). The 2-bit HARQ-ACK information is modulated into a complex-valued symbol through QPSK. When sending a PUCCH that carries the one or two bits, the terminal device also needs to send a DMRS. Because the DMRS is used for PUCCH demodulation, the network device may perform PUCCH demodulation based on the DMRS sent by the terminal device. It should be noted that the PUCCH format 1 is merely a name, and may also be named differently. This is not limited in the present invention.

In an NR system, for BPSK modulation, a complex-valued symbol may be generated by using 1-bit HARQ-ACK information according to $$x = \frac{1}{\sqrt{2}}[(1 - 2b(i)) + j(1 - 2b(i))],$$

where b(i) represents the 1-bit HARQ-ACK information. When b(i)=1, that is, when the HARQ-ACK information is an ACK, the complex-valued symbol is $$x = \frac{1}{\sqrt{2}}[-1 - j].$$

When b(i)=0, that is, when the HARQ-ACK information is a NACK, the complex-valued symbol is $$x = \frac{1}{\sqrt{2}}[1 + j].$$

For quadrature phase shift keying (QPSK) modulation, a complex-valued symbol may be generated by using 2-bit HARQ-ACK information according to $$x = \frac{1}{\sqrt{2}}[(1-2b(i)) + j(1-2b(i+1))],$$

where b(i), b(i+1) represents the 2-bit HARQ-ACK information. When b(i),b(i+1)=11, that is, when the HARQ-ACK information is {ACK, ACK}, the complex-valued symbol is $$x = \frac{1}{\sqrt{2}}[-1-j].$$

When b(i), b(i+1)=00, that is, when the HARQ-ACK information is {NACK, NACK}, the complex-valued symbol is $$x = \frac{1}{\sqrt{2}}[1+j].$$

When b(i),b(i+1)=10, that is, when the HARQ-ACK information is {ACK, NACK}, the complex-valued symbol is $$x = \frac{1}{\sqrt{2}}[-1+j].$$

When b(i), b(i+1)=01, that is, when the HARQ-ACK information is {NACK, ACK}, the complex-valued symbol is $$x = \frac{1}{\sqrt{2}}[1-j].$$

A PDCCH is used to carry downlink control information (DCI), where the DCI includes downlink scheduling information, and the downlink scheduling information includes time-frequency resource allocation, a modulation and coding scheme, and the like. In a downlink data transmission process, the terminal device performs blind detection on the PDCCH to obtain required DCI. If the terminal device successfully detects the PDCCH, the terminal device decodes a PDSCH based on the downlink scheduling information carried on the PDCCH, and feeds back HARQ-ACK information on the PDSCH to the network device. When the PDSCH is successfully decoded, the terminal device feeds back an ACK to the network device. When the PDSCH fails to be decoded, the terminal device feeds back a NACK to the network device. If the terminal device does not detect the PDCCH, the terminal device does not decode the PDSCH, and does not need to feed back the HARQ-ACK information. During PDCCH blind detection, miss detection may occur. A probability of the miss detection is referred to as a miss detection probability. Generally, an index for the PDCCH miss detection probability is $10^{-2}$. In other words, one of 100 PDCCH blind detections is missed.

The network device sends, to the terminal device, a first PDCCH, a first PDSCH scheduled by using the first PDCCH, a second PDCCH, and a second PDSCH scheduled by using the second PDCCH. Because there is a miss detection probability, the terminal device misses detecting the second PDCCH and detects only the first PDCCH. In this case, the terminal device considers that the network device sends only the first PDCCH and the first PDSCH. Therefore, the terminal device feeds back only 1-bit HARQ-ACK information to the network device, where the HARQ-ACK information is an ACK or a NACK. If the first PDSCH is correctly decoded, the terminal device generates a signal based on the ACK and sends the signal. According to an existing PUCCH design, there are problems described in the following scenarios:

Scenario 1: In an LTE system, in a non-carrier aggregation (CA) scenario, for HARQ-ACK information on a PDSCH transmitted within 1 ms, a quantity of HARQ-ACK information bits is determined based on a fixed codebook. Therefore, once there is a first PDSCH transmitted, even if the terminal device does not receive a second PDSCH, the terminal device still needs to retain a HARQ-ACK information bit for the second PDSCH. Consequently, HARQ-ACK information of at least two bits needs to be sent finally. To enhance performance and coverage of the HARQ-ACK information, in the non-CA scenario, for the HARQ-ACK information on the PDSCH transmitted within 1 ms, the quantity of HARQ-ACK information bits needs to be determined based on a dynamic codebook. In this way, when there is no PDSCH transmitted within 1 ms, the terminal device may feed back 1-bit HARQ-ACK information on only the first PDSCH. Therefore, the quantity of HARQ-ACK information bits changes. For example, at a moment 1, the terminal device feeds back 1-bit HARQ-ACK information only on the first PDSCH, at a moment 2, the terminal device feeds back 2-bit HARQ-ACK information on the first PDSCH and the second PDSCH. When the PUCCH based on sequence selection is used, for 2-bit HARQ-ACK information, the first bit is HARQ-ACK information on a first PDSCH, and the second bit is HARQ-ACK information on a second PDSCH. For 1-bit HARQ-ACK information, the bit is HARQ-ACK information on a first PDSCH. When the PUCCH based on sequence selection is used, an ACK and {NACK, ACK} correspond to a same PUCCH resource and the network device does not know that the terminal device misses detecting a second PDCCH. Therefore, when the network device detects signal energy on a PUCCH resource, the network device misinterprets that HARQ-ACK information fed back by the terminal device is {NACK, ACK}, that is, considers that a first PDSCH fails to be decoded and that a second PDSCH is correctly decoded, and the network device retransmits the first PDSCH, reducing transmission efficiency. More seriously, the network device considers that the second PDSCH is correctly received, and therefore does not retransmit the second PDSCH. Consequently, the second PDSCH fails to be received. It should be noted that in scenario 1, a transmission duration of the first PDSCH is less than 1 ms, for example, one, two, or three symbols, and a transmission duration of the second PDSCH is 1 ms.

Scenario 2: In an NR system, when HARQ-ACK information is configured based on a dynamic codebook, a downlink assignment index (DAI) includes a 2-bit counter DAI and/or a 2-bit total DAI. If a first PDCCH is sent before a second PDCCH, a DAI in DCI carried on the first PDCCH does not indicate existence of the second PDCCH. Because there is a PDCCH miss detection probability, when the terminal device does not detect the second PDCCH sent by the network device, the terminal device feeds back HARQ-ACK information based on a HARQ-ACK information mapping relationship in a PUCCH based on sequence selection in the existing NR system, or feeds back HARQ-ACK information based on a complex-valued symbol generation method in a DMRS-based PUCCH in the existing NR system. This causes a failure in receiving the second PDSCH. Specifically, the following two sub-scenarios are included:

Scenario 2A: When a PUCCH based on sequence selection is used, an ACK and {ACK, ACK} correspond to a same cyclic shift. The network device does not know that the terminal device is missed detecting a second PDCCH. Therefore, when the network device detects signal energy on a PUCCH resource, the network device misinterprets that HARQ-ACK information fed back by the terminal device is {ACK, ACK}, that is, considers that a second PDSCH is correctly decoded. In this case, the network device does not retransmit the second PDSCH, resulting in a failure in receiving the second PDSCH by the terminal device.

Scenario 2B: In the NR system, when a DMRS-based PUCCH is used, an ACK and {ACK, ACK} correspond to a same complex-valued symbol $$\frac{1}{\sqrt{2}}[-1-j],$$

and the network device does not know that the terminal device misses detecting a second PDCCH. Therefore, when the network device detects the complex-valued symbol $$\frac{1}{\sqrt{2}}[-1-j],$$

the network device misinterprets that HARQ-ACK information fed back by the terminal device is {ACK, ACK}, that is, considers that a first PDSCH and a second PDSCH are both correctly decoded. In this case, the network device retransmits neither the first PDSCH nor the second PDSCH, resulting in a failure in receiving the second PDSCH by the terminal device.

Scenario 2C: In the NR system, when a PUCCH based on sequence selection is used, and an SR transmission status is negative SR transmission, a correspondence between 1-bit HARQ-ACK information and a cyclic shift is that a NACK corresponds to a cyclic shift $m_{CS}=0$, and that an ACK corresponds to a cyclic shift $m_{cs}=6$, a correspondence between 2-bit HARQ-ACK information and a cyclic shift is: {NACK, NACK} corresponds to a cyclic shift $m_{CS}=0$, {NACK, ACK} corresponds to a cyclic shift $m_{cs}=3$, {ACK, ACK} corresponds to a cyclic shift $m_{cs}=6$, and {ACK, NACK} corresponds to a cyclic shift $m_{cs}=9$. When the SR transmission status is positive SR transmission, a correspondence between 1-bit HARQ-ACK information and a cyclic shift is that a NACK corresponds to a cyclic shift $m_{cs}=3$ and that an ACK corresponds to a cyclic shift $m_{cs}=9$, a correspondence between 2-bit HARQ-ACK information and a cyclic shift is: {NACK, NACK} corresponds to a cyclic shift m-hd cs=1, {NACK, ACK} corresponds to a cyclic shift $m_{cs}=4$, {ACK, ACK} corresponds to a cyclic shift $m_{cs}=7$, and {ACK, NACK} corresponds to a cyclic shift $m_{cs}=10$. If a first PDCCH is sent before a second PDCCH, a DAI in DCI carried on the first PDCCH does not indicate existence of the second PDCCH. Because there is a PDCCH miss detection probability, when the terminal device does not detect the second PDCCH sent by the network device, and needs to send a positive SR (that is, the SR transmission status is positive SR transmission), if the first PDSCH is incorrectly decoded, that is, the HARQ-ACK information is a NACK, the terminal device generates a cyclic shift based on $m_{cs}=3$. Because the network device does not know that the terminal device misses detecting the second PDCCH, the network device considers that the terminal device currently feeds back 2-bit HARQ-ACK information. Therefore, when the network device calculates $m_{cs}=3$, the network device misinterprets that a status of the HARQ-ACK information fed back by the terminal device is {NACK, ACK}, that is, considers that the first PDSCH fails to be decoded and the second PDSCH is correctly decoded. In this case, the network device does not retransmit the second PDSCH, resulting in a failure in receiving the second PDSCH.

To resolve the problem that the second PDSCH fails to be received in the scenario 1, the scenario 2A, and the scenario 2C, an embodiment of this application provides an uplink control information transmission method. FIG. 3 is a flowchart of an uplink control information transmission method according to Embodiment 1 of this application. As shown in FIG. 3, the method provided in this embodiment includes the following steps.

Step S101: A terminal device determines, based on HARQ-ACK information and a mapping relationship, a channel resource corresponding to the HARQ-ACK information, where a channel resource corresponding to an ACK and a channel resource corresponding to {ACK, NACK} in the mapping relationship are the same.

Optionally, before step S101, the terminal device needs to determine the HARQ-ACK information. For example, a network device sends a first PDCCH and a second PDCCH to the terminal device. When the terminal device detects the first PDCCH but does not detect the second PDCCH, the terminal device determines 1-bit HARQ-ACK information, where the first PDCCH is used to schedule a first PDSCH, the second PDCCH is used to schedule a second PDSCH, and the 1-bit HARQ-ACK information is HARQ-ACK information on the first PDSCH. When the terminal device detects the first PDCCH and the second PDCCH, the terminal device determines 2-bit HARQ-ACK information, where the 2-bit HARQ-ACK information is HARQ-ACK information on the first PDSCH and the second PDSCH.

Unless otherwise specified, in all embodiments of this application, the 2-bit HARQ-ACK information is {HARQ-ACK information on the first PDSCH, HARQ-ACK information on the second PDSCH}. Therefore, the {ACK, NACK} indicates that the HARQ-ACK information on the first PDSCH is an ACK and the HARQ-ACK information on the second PDSCH is a NACK. It should be noted that the 2-bit HARQ-ACK information may alternatively be {HARQ-ACK information on the second PDSCH, HARQ-ACK information on the first PDSCH}. In this case, step S101 is: A terminal device determines, based on HARQ-ACK information and a mapping relationship, a channel resource corresponding to the HARQ-ACK information, where a channel resource corresponding to an ACK and a channel resource corresponding to {NACK, ACK} in the mapping relationship are the same. In this case, the {NACK, ACK} indicates that the HARQ-ACK information on the first PDSCH is an ACK and the HARQ-ACK information on the second PDSCH is a NACK. Similarly, a sequence of elements in the 2-bit HARQ-ACK information in all the embodiments of this application needs to be correspondingly adjusted.

The 1-bit HARQ-ACK information may be an ACK or a NACK. The 2-bit HARQ-ACK information may be {ACK, ACK}, {NACK, NACK}, {ACK, NACK}, and {NACK, ACK}. The ACK may be represented by 1, and the NACK may be represented by 0.

Optionally, a transmission duration of the first PDSCH is less than 1 ms, for example, is one, two, or three symbols, and a transmission duration of the second PDSCH is 1 ms.

Optionally, the mapping relationship is preconfigured in the terminal device. For example, when the terminal device is delivered from a factory, the mapping relationship is preset in the terminal device. Alternatively, the mapping relationship may be obtained by the terminal device by receiving signaling sent by the network device. For example, the network device sends the mapping relationship to the terminal device by using a radio resource control (RRC) message. Alternatively, a plurality of mapping relationships are predefined in a standard, and the network device may indicate, by using signaling, a mapping relationship currently used by the terminal device.

The mapping relationship includes a mapping relationship between the channel resource and the HARQ-ACK information, and the channel resource may be a PUCCH resource and/or an SR PUCCH resource. The channel resource may alternatively be a cyclic shift. In this case, the mapping relationship includes a mapping relationship between the cyclic shift and the HARQ-ACK information, and the cyclic shift may be a PUCCH cyclic shift and/or an SR PUCCH cyclic shift. The HARQ-ACK information may be 1-bit HARQ-ACK information and/or 2-bit HARQ-ACK information.

Optionally, the channel resource in the mapping relationship includes at least a first PUCCH resource and a second PUCCH resource. The mapping relationship includes: the ACK corresponds to the second PUCCH resource, and {ACK, NACK} corresponds to the second PUCCH resource. Certainly, the mapping relationship may further include a correspondence between a channel resource and other HARQ-ACK information than the ACK and the {ACK, NACK}.

Correspondingly, that a terminal device determines, based on HARQ-ACK information and a mapping relationship, a channel resource corresponding to the HARQ-ACK information is specifically: when the HARQ-ACK information is the ACK, the terminal device determines, based on the ACK and the mapping relationship, that the channel resource corresponding to the ACK is the second PUCCH resource, or when the HARQ-ACK information is the {ACK, NACK}, the terminal device determines, based on the {ACK, NACK} and the mapping relationship, that the channel resource corresponding to the {ACK, NACK} is the second PUCCH resource.

Optionally, the mapping relationship further includes: the NACK corresponds to the first PUCCH resource, and the {NACK, NACK} corresponds to the first PUCCH resource. Further, the mapping relationship further includes: the {NACK, ACK} corresponds to a third PUCCH resource and the {ACK, ACK} corresponds to a fourth PUCCH resource, or the {ACK, ACK} corresponds to a third PUCCH resource and the {NACK, ACK} corresponds to a fourth PUCCH resource. It should be noted that "first/second/third/fourth" in the first/second/third/fourth PUCCH resource does not indicate a sequence, and is merely used to distinguish different PUCCH resources. Alternatively, $n_{SPUCCH,i}^{(1,\tilde{p})}$ may be used to represent the channel resource, where $n_{SPUCCH,0}^{(1,\tilde{p})}$ represents the first PUCCH resource, $n_{SPUCCH,1}^{(1,\tilde{p})}$ represents the second PUCCH resource, $n_{SPUCCH,2}^{(1,\tilde{p})}$ represents the third PUCCH resource, and $n_{SPUCCH,3}^{(1,\tilde{p})}$ represents the fourth PUCCH resource. Table 1 is a schematic table of the mapping relationship.

TABLE 1

| sPUCCH format | HARQ-ACK information | PUCCH resource |
| --- | --- | --- |
| 1a | 0 | First PUCCH resource |
|  | 1 | Second PUCCH resource |
| 1b | 00 | First PUCCH resource |
|  | 10 | Second PUCCH resource |
|  | 01 | Third PUCCH resource |
|  | 11 | Fourth PUCCH resource |

Short PUCCH (sPUCCH) formats 1a and 1b are applicable to transmission of HARQ-ACK information with a transmission duration of one, two, or three symbols. Based on selection of an sPUCCH resource, the sPUCCH format 1a is used to indicate 1-bit HARQ-ACK information, and the sPUCCH format 1b is used to indicate 2-bit HARQ-ACK information. In Table 1, a bit value '0' indicates that the HARQ-ACK information is a NACK, a bit value '1' indicates that the HARQ-ACK information is an ACK, a bit value '00' indicates that the HARQ-ACK information is {NACK, NACK}, a bit value '10' indicates that the HARQ-ACK information is {ACK, NACK}, a bit value '01' indicates that the HARQ-ACK information is {NACK, ACK}, and a bit value '11' indicates that the HARQ-ACK information is {ACK, ACK}.

Short PUCCH (sPUCCH) formats 1a and 1b are applicable to transmission of HARQ-ACK information with a transmission duration of one, two, or three symbols. Based on selection of an sPUCCH resource, the sPUCCH format 1a is used to indicate 1-bit HARQ-ACK information, and the sPUCCH format 1b is used to indicate 2-bit HARQ-ACK information. In Table 1, a bit value '0' indicates that the HARQ-ACK information is a NACK, a bit value '1' indicates that the HARQ-ACK information is an ACK, a bit value '00' indicates that the HARQ-ACK information is {NACK, NACK}, a bit value indicates that the HARQ-ACK information is {ACK, NACK}, a bit value '01' indicates that the HARQ-ACK information is {NACK, ACK}, and a bit value '11' indicates that the HARQ-ACK information is {ACK, ACK}.

In this embodiment, a sending moment of an SR may be the same as a sending moment of the HARQ-ACK information. When the sending moment of the SR is the same as the sending moment of the HARQ-ACK information, the terminal device may determine, based on an SR transmission status, the HARQ-ACK information, and the mapping relationship, the channel resource corresponding to the HARQ-ACK information. The SR transmission status includes positive SR transmission and negative SR transmission. When the SR transmission status is negative SR transmission, the terminal device needs to send only the HARQ-ACK information to the network device, and does not need to send the SR. When the SR transmission status is positive SR transmission, the terminal device needs to send both the HARQ-ACK information and the SR to the network device.

Correspondingly, the channel resource in the mapping relationship includes at least a first SR PUCCH resource, a second SR PUCCH resource, a first PUCCH, and a second PUCCH. The mapping relationship includes: the ACK corresponds to the second SR PUCCH resource and the {ACK, NACK} corresponds to the second SR PUCCH resource when the SR transmission status is positive SR transmission, and the ACK corresponds to the second PUCCH resource and the {ACK, NACK} corresponds to the second PUCCH resource when the SR transmission status is negative SR transmission. That a terminal device determines, based on HARQ-ACK information and a mapping relationship, a channel resource corresponding to the HARQ-ACK information is specifically: when the HARQ-ACK information is the ACK and the SR transmission status is positive SR transmission, the terminal device determines, based on the mapping relationship, that the channel resource corresponding to the ACK is the second SR PUCCH resource, when the HARQ-ACK information is the {ACK, NACK} and the SR transmission status is positive SR transmission, the terminal device determines, based on the mapping relationship, that the channel resource corresponding to the {ACK, NACK} is the second SR PUCCH resource, when the HARQ-ACK information is the ACK and the SR transmission status is negative SR transmission, the terminal device determines, based on the mapping relationship, that the channel resource corresponding to the ACK is the second PUCCH resource, or when the HARQ-ACK information is the {ACK, NACK} and the SR transmission status is negative SR transmission, the terminal device determines, based on the mapping relationship, that the channel resource corresponding to the {ACK, NACK} is the second PUCCH resource.

Optionally, the mapping relationship meets Table 1 to Table 3. Table 2 and Table 3 are shown as follows:

TABLE 2

| HARQ-ACK information | SR transmission status | PUCCH resource |
|---|---|---|
| ACK/NACK | Negative | PUCCH resource corresponding to the sPUCCH format 1a in Table 1 |
| NACK | Positive | First SR PUCCH resource |
| ACK | Positive | Second SR PUCCH resource |

TABLE 3

| HARQ-ACK information (0) | HARQ-ACK information (1) | SR transmission status | PUCCH resource |
|---|---|---|---|
| ACK/NACK | ACK/NACK | Negative | PUCCH resource corresponding to the sPUCCH format 1b in Table 1 |
| NACK | NACK | Positive | First SR PUCCH resource |
| ACK | NACK | Positive | Second SR PUCCH resource |
| NACK | ACK | Positive | Third SR PUCCH resource |
| ACK | ACK | Positive | Fourth SR PUCCH resource | where when the SR transmission status is negative SR transmission, the correspondence between the HARQ-ACK information and the channel resource meets Table 1, when the SR transmission status is positive SR transmission, the correspondence between the HARQ-ACK information and the channel resource meets Table 2 and Table 3.

The ACK/NACK in Table 2 and Table 3 represents an ACK or a NACK. As shown in Table 2, when the SR transmission status is negative SR transmission, a PUCCH resource corresponding to the HARQ-ACK information (the ACK or the NACK) is the PUCCH resource corresponding to the sPUCCH format 1a in Table 1. As shown in Table 3, when the SR transmission status is negative SR transmission, a PUCCH resource corresponding to the HARQ-ACK information (including {ACK, ACK}, {NACK, NACK}, {ACK, NACK}, and {NACK, ACK}) is the PUCCH resource corresponding to the sPUCCH format 1b in Table 1. The HARQ-ACK information (0) represents first-bit HARQ-ACK information in 2-bit HARQ-ACK information, that is, the HARQ-ACK information on the first PDSCH. The HARQ-ACK information (1) represents second-bit HARQ-ACK information in the 2-bit HARQ-ACK information, that is, the HARQ-ACK information on the second PDSCH.

Optionally, the channel resource corresponding to the HARQ-ACK information is a cyclic shift corresponding to the HARQ-ACK information, and correspondingly, cyclic shifts in the mapping relationship include at least a first cyclic shift and a second cyclic shift. The mapping relationship includes: the ACK corresponds to the second cyclic shift, and the {ACK, NACK} corresponds to the second cyclic shift. Certainly, the mapping relationship may further include a correspondence between a cyclic shift and other HARQ-ACK information than the ACK and the {ACK, NACK}. It should be noted that the cyclic shift in the optional solution may be referred to as a sequence cyclic shift. For example, the first/second cyclic shift is referred to as a first/second sequence cyclic shift. Other similar parts are not further described.

Correspondingly, that a terminal device determines, based on HARQ-ACK information and a mapping relationship, a channel resource corresponding to the HARQ-ACK information is specifically: when the HARQ-ACK information is the ACK, the terminal device determines, based on the mapping relationship, that a cyclic shift corresponding to the ACK is the second cyclic shift, or when the HARQ-ACK information is the {ACK, NACK}, the terminal device determines, based on the mapping relationship, that a cyclic shift corresponding to the {ACK, NACK} is the second cyclic shift.

Optionally, the mapping relationship is a mapping relationship 1 or a mapping relationship 2, where the mapping relationship 1 meets Table 4 and Table 5, and the mapping relationship 2 meets Table 6 and Table 7. Table 4 to Table 7 are shown as follows:

TABLE 4

| | HARQ-ACK information | |
|---|---|---|
| | 1 | 1 |
| Cyclic shift | $m_{CS} = 0$ | $m_{CS} = 6$ |

TABLE 5

| | HARQ-ACK information | | | |
|---|---|---|---|---|
| | 1 | {0, 1} | {1, 0} | {1, 1} |
| Cyclic shift | $m_{CS} = 0$ | $m_{CS} = 3$ | $m_{CS} = 6$ | $m_{CS} = 9$ |

TABLE 6

| | HARQ-ACK information | |
|---|---|---|
| | 0 | 1 |
| Cyclic shift | $m_{cs} = 0$ | $m_{cs} = 9$ |

TABLE 7

| | HARQ-ACK information | | | |
|---|---|---|---|---|
| | {0, 0} | {0, 1} | {1, 1} | {1, 0} |
| Cyclic shift | $m_{cs} = 0$ | $m_{cs} = 3$ | $m_{cs} = 6$ | $m_{cs} = 9$ | where 1 indicates that the HARQ-ACK information is an ACK, and 0 indicates that the HARQ-ACK information is a NACK.

Correspondingly, before the terminal device determines, based on the HARQ-ACK information and the mapping relationship, the channel resource corresponding to the HARQ-ACK information, the terminal device receives indication information sent by the network device, where the indication information indicates that the mapping relationship is the mapping relationship 1 or the mapping relationship 2. The terminal device determines, based on the indication information and by using the mapping relationship indicated by the network device, the cyclic shift corresponding to the HARQ-ACK information. The network device may use dynamic signaling to carry the indication information, where the dynamic signaling is, for example, MAC layer signaling or physical layer signaling.

Optionally, the mapping relationship may alternatively be a mapping relationship 3, a mapping relationship 4, a mapping relationship 5, or a mapping relationship 6. The mapping relationship 3 meets Table 4 and Table 8, the mapping relationship 4 meets Table 6 and Table 9, the mapping relationship 5 meets Table 10 and Table 11, and the mapping relationship 6 meets Table 10 and Table 12. Table 8 to Table 12 are shown as follows:

TABLE 8

| | HARQ-ACK information | | | |
|---|---|---|---|---|
| | {0, 0} | {1, 1} | {1, 0} | {0, 1} |
| Cyclic shift | $m_{cs} = 0$ | $m_{cs} = 3$ | $m_{cs} = 6$ | $m_{cs} = 9$ |

TABLE 9

| | HARQ-ACK information | | | |
|---|---|---|---|---|
| | {0, 0} | {1, 1} | {0, 1} | {1, 0} |
| Cyclic shift | $m_{cs} = 0$ | $m_{cs} = 3$ | $m_{cs} = 6$ | $m_{cs} = 9$ |

TABLE 10

| | HARQ-ACK information | |
|---|---|---|
| | 0 | 1 |
| Cyclic shift | $m_{cs} = 0$ | $m_{cs} = 3$ |

TABLE 11

| | HARQ-ACK information | | | |
|---|---|---|---|---|
| | {0, 0} | {1, 0} | {1, 1} | {0, 1} |
| Cyclic shift | $m_{cs} = 0$ | $m_{cs} = 3$ | $m_{cs} = 6$ | $m_{cs} = 9$ |

TABLE 12

| | HARQ-ACK information | | | |
|---|---|---|---|---|
| | {0, 0} | {1, 0} | {0, 1} | {1, 1} |
| Cyclic shift | $m_{cs} = 0$ | $m_{cs} = 3$ | $m_{cs} = 6$ | $m_{cs} = 9$ |

Optionally, before the terminal device determines, based on the HARQ-ACK information and the mapping relationship, the channel resource corresponding to the HARQ-ACK information, the terminal device receives indication information sent by the network device, where the indication information indicates that the mapping relationship is any one of the mapping relationship 1 to the mapping relationship 6. For example, when a transmit probability of the 1-bit HARQ-ACK information is higher than that of the 2-bit HARQ-ACK information, the network device may indicate that the mapping relationship is the mapping relationship 1 or the mapping relationship 3. In this case, a cyclic shift interval corresponding to two state values of the 1-bit HARQ-ACK is the largest, and performance is the best. For example, when a transmit probability of the 2-bit HARQ-ACK information is higher than that of the 1-bit HARQ-ACK information, the network device may indicate that the mapping relationship is the mapping relationship 3, the mapping relationship 4, the mapping relationship 5, or the mapping relationship 6.

In an NR system, when the terminal device needs to feed back a HARQ-ACK and send an SR, an existing HARQ-ACK feedback mechanism and an existing SR transmission mechanism are used, as described in the foregoing scenario 2C, the network device incorrectly decodes the HARQ-ACK information fed back by the terminal device, resulting in a failure in receiving the second PDSCH. In this embodiment, when the sending moment of the SR is the same as the sending moment of the HARQ-ACK information, the terminal device may determine, based on an SR transmission status, the HARQ-ACK information, and the mapping relationship, the cyclic shift corresponding to the HARQ-ACK information. Correspondingly, cyclic shifts in the mapping relationship include at least a first SR PUCCH cyclic shift, a second SR PUCCH cyclic shift, a first PUCCH cyclic shift, and a second PUCCH cyclic shift. The mapping relationship includes: the ACK corresponds to the second SR PUCCH cyclic shift and the {ACK, NACK} corresponds to the second SR PUCCH cyclic shift when the SR transmission status is positive SR transmission, the ACK corresponds to the second PUCCH cyclic shift and the {ACK, NACK} corresponds to the second PUCCH cyclic shift when the SR transmission status is negative SR transmission.

Optionally, when the SR transmission status is negative SR transmission, the correspondence between the HARQ-ACK information and the cyclic shift meets Table 4 and Table 5, when the SR transmission status is positive SR transmission, the correspondence between the HARQ-ACK information and the cyclic shift meets Table 13 and Table 14. When values in Table 4 and Table 13 are used, a cyclic shift interval is relatively large, and performance can be ensured. In addition, cyclic shifts corresponding to the ACK and a positive SR are different from cyclic shifts corresponding to the {ACK, ACK} and a negative SR. When the second PDCCH is discarded, the network device does not misinterpret that the second PDSCH is correctly received.

TABLE 13

| | HARQ-ACK information | |
|---|---|---|
| | 0 | 1 |
| Cyclic shift | $m_{cs} = 4$ | $m_{cs} = 10$ |

TABLE 14

| | HARQ-ACK information | | | |
|---|---|---|---|---|
| | {0, 1} | {0, 0} | {1, 1} | {1, 0} |
| Cyclic shift | $m_{cs} = 1$ | $m_{cs} = 4$ | $m_{cs} = 7$ | $m_{cs} = 10$ |

Optionally, that the terminal device determines, based on the HARQ-ACK information and the mapping relationship, the cyclic shift corresponding to the HARQ-ACK information includes: when the HARQ-ACK information is the ACK and the SR transmission status is positive SR transmission, the terminal device determines, based on the mapping relationship (for example, Table 13), that the cyclic shift corresponding to the ACK is $m_{cs}=10$, or when the HARQ-ACK information is the {ACK, NACK} and the SR transmission status is positive SR transmission, the terminal device determines, based on the mapping relationship (for example, Table 14), that the cyclic shift corresponding to the {ACK, NACK} is $m_{cs}=10$, or when the HARQ-ACK information is the ACK and the SR transmission status is negative SR transmission, the terminal device determines, based on the mapping relationship (for example, Table 4), that the cyclic shift corresponding to the ACK is $m_{cs}=6$, or when the HARQ-ACK information is the {ACK, NACK} and the SR transmission status is negative SR transmission, the terminal device determines, based on the mapping relationship (for example, Table 5), that the cyclic shift corresponding to the {ACK, NACK} is $m_{cs}=6$.

Step S102: The terminal device generates an uplink signal based on the channel resource corresponding to the HARQ-ACK information.

Optionally, the terminal device generates a sequence based on the channel resource corresponding to the HARQ-ACK information, multiplies the sequence by an amplitude factor (amplitude scaling factor), maps the sequence to a physical resource based on the channel resource, and then generates the uplink signal. For example, the terminal device generates the uplink signal according to an OFDM generation principle.

Optionally, the terminal device generates a sequence x(n) based on the cyclic shift corresponding to the HARQ-ACK information, multiplies the sequence by an amplitude factor (amplitude scaling factor) $\beta_{PUCCH,0}$, maps the sequence to a physical resource, and then generates the uplink signal. For example, the uplink signal may be an OFDM baseband signal. Optionally, the terminal device generates the sequence x(n) according to formula 1. For a specific meaning of $r_{u,v}^{(\alpha,\delta)}(n)$, refer to the protocol 38.211.

$$x(l \cdot N_{sc}^{RB} + n) = r_{u,v}^{(\alpha,\delta)}(n) \quad \text{(Formula 1)}$$

$$n = 0, 1, \ldots, N_{sc}^{RB} - 1$$

$$l = \begin{cases} 0 & \text{1-symbol } PUCCH \text{ transmission} \\ 0, 1 & \text{2-symbol } PUCCH \text{ transmission} \end{cases}$$

Optionally, the cyclic shift is represented by $\alpha=F(m_{CS})$, that is, $\alpha$ is a function with a variable of $m_{cs}$. It should be noted that, $\alpha$ varies with a symbol and a slot. Therefore, independent variables of the function further include another parameter in addition to $m_{cs}$. Values of $m_{cs}$ are shown in Table 4 to Table 14. Optionally, $\alpha$ may be formula 2:

$$\alpha_l = \frac{2\pi}{N_{sc}^{RB}}((m_0 + m_{cs} + n_{cs}(n_s, l + l')) \bmod N_{sc}^{RB}) \quad \text{(Formula 2)}$$

For a meaning of a parameter in formula 2, refer to TS 38.211. $n_s$ is a slot number in a radio frame, l is a symbol number in PUCCH transmission, $m_0$ is indicated by using higher layer signaling, $N_{sc}^{RB}$ represents a quantity of sub-carriers included in one RB, l' represents a symbol number, in PUCCH transmission, of the first symbol in a slot, $m_{cs}$ represents a cyclic shift (the cyclic shift corresponding to the foregoing HARQ-ACK information), and $n_{cs}(n_s,l+l')$ represents a random function.

Step S103: The terminal device sends the uplink signal.

The terminal device sends the uplink signal to the network device, where the uplink signal carries the HARQ-ACK information, or the uplink signal further carries a positive SR.

In this embodiment, the terminal device determines, based on the HARQ-ACK information and the mapping relationship, the channel resource corresponding to the HARQ-ACK information, where the channel resource corresponding to the ACK and the channel resource corresponding to the {ACK, NACK} in the mapping relationship are the same. The terminal device generates the uplink signal based on the channel resource corresponding to the HARQ-ACK information, and sends the uplink signal. The channel resource corresponding to the ACK and the channel resource corresponding to the {ACK, NACK} are the same. Therefore, when a first PDSCH is correctly received and detection of a second PDCCH is missed, the terminal device sends the uplink signal to the network device based on the channel resource corresponding to the ACK. Correspondingly, because the network device sends two PDCCHs to the terminal device, the network device may determine that a quantity of HARQ-ACK information bits corresponding to the channel resource is 2. In this way, the network device can determine, based on the channel resource corresponding to the ACK and the quantity of HARQ-ACK information bits corresponding to the channel resource, that the HARQ-ACK information corresponding to a channel resource used to feed back the uplink signal by the terminal device is the {ACK, NACK}. That is, the network device can determine that the terminal device successfully receives the first PDSCH but fails to receive a second PDSCH, and further can retransmit the second PDSCH, thereby ensuring that the terminal device can correctly receive the second PDSCH.

To resolve the problem that the PDSCH fails to be received in the scenario 2C, Embodiment 2 of this application provides an uplink control information transmission method. FIG. 4 is a flowchart of the uplink control information transmission method according to Embodiment 2 of this application. As shown in FIG. 4, the method provided in this embodiment includes the following steps.

Step S201: When an SR transmission status is negative SR transmission, a terminal device determines, based on HARQ-ACK information and a first mapping relationship, a channel resource corresponding to the HARQ-ACK information, or when an SR transmission status is positive SR transmission, the terminal device determines, based on HARQ-ACK information and a second mapping relationship, a channel resource corresponding to the HARQ-ACK information.

The first mapping relationship includes a correspondence that is between the HARQ-ACK information and the channel resource and that exists when the SR transmission status is negative SR transmission. The second mapping relationship includes a correspondence that is between the HARQ-ACK information and the channel resource and that exists when the SR transmission status is positive SR transmission. A channel resource corresponding to a NACK in the second mapping relationship is the same as a channel resource corresponding to {NACK, NACK} in the first mapping relationship, and a channel resource corresponding to an ACK in the second mapping relationship is the same as a channel resource corresponding to {ACK, NACK} in the first mapping relationship.

Specifically, when the terminal device detects a first PDCCH but does not detect a second PDCCH, and the terminal device does not need to send a positive SR (to be specific, the SR transmission status is negative SR transmission), the terminal device determines that uplink control information that needs to be sent to a network device includes 1-bit HARQ-ACK information, where the 1-bit HARQ-ACK information is HARQ-ACK information on a first PDSCH.

When the terminal device detects a first PDCCH and a second PDCCH, and the terminal device does not need to send an SR (to be specific, the SR transmission status is positive SR transmission), the terminal device determines that uplink control information that needs to be sent to a network device includes 2-bit HARQ-ACK information, where the 2-bit HARQ-ACK information is HARQ-ACK information on a first PDSCH and a second PDSCH.

When the terminal device detects a first PDCCH but does not detect a second PDCCH, and the terminal device needs to send an SR, the terminal device determines that uplink control information that needs to be sent to a network device includes 1-bit HARQ-ACK information and the SR, where the 1-bit HARQ-ACK information is HARQ-ACK information on a first PDSCH.

When the terminal device detects a first PDCCH and a second PDCCH, and the terminal device needs to send a positive SR, the terminal device determines that uplink control information that needs to be sent to a network device includes 2-bit HARQ-ACK information and the positive SR, where the 2-bit HARQ-ACK information is HARQ-ACK information on a first PDSCH and a second PDSCH.

In this embodiment, the channel resource corresponding to the NACK in the second mapping relationship is the same as the channel resource corresponding to the {NACK, NACK} in the first mapping relationship, and the channel resource corresponding to the ACK in the second mapping relationship is the same as the channel resource corresponding to the {ACK, NACK} in the first mapping relationship. Optionally, an ACK and the {ACK, NACK} in the first mapping relationship correspond to a same channel resource. That is, the first mapping relationship may be any mapping relationship described in Embodiment 1.

Optionally, the channel resource corresponding to the HARQ-ACK information is a cyclic shift corresponding to the HARQ-ACK information, and correspondingly, cyclic shifts in the second mapping relationship include at least a first cyclic shift and a second cyclic shift. The second mapping relationship includes: the NACK corresponds to the first cyclic shift, and the ACK corresponds to the second cyclic shift. In this case, that the terminal device determines, based on HARQ-ACK information and a second mapping relationship, a channel resource corresponding to the HARQ-ACK information is specifically: when the HARQ-ACK information is the NACK and the SR transmission status is positive SR transmission, the terminal device determines, based on the second mapping relationship, that a cyclic shift corresponding to the NACK is the first cyclic shift, or when the HARQ-ACK information is the ACK and the SR transmission status is positive SR transmission, the terminal device determines, based on the second mapping relationship, that a cyclic shift corresponding to the ACK is the second cyclic shift.

Optionally, cyclic shifts in the first mapping relationship include at least a first cyclic shift and a second cyclic shift. The first mapping relationship includes: the ACK corresponds to the second cyclic shift, and the {ACK, NACK} corresponds to the second cyclic shift. In this case, that a terminal device determines, based on HARQ-ACK information and a first mapping relationship, a channel resource corresponding to the HARQ-ACK information is specifically: when the HARQ-ACK information is the NACK, the terminal device determines, based on the first mapping relationship, that a cyclic shift corresponding to the NACK is the first cyclic shift, when the HARQ-ACK information is the ACK, the terminal device determines, based on the first mapping relationship, that a cyclic shift corresponding to the ACK is the second cyclic shift, when the HARQ-ACK information is the {NACK, NACK}, the terminal device determines, based on the first mapping relationship, that a cyclic shift corresponding to the {NACK, NACK} is the first cyclic shift, or when the HARQ-ACK information is the {ACK, NACK}, the terminal device determines, based on the first mapping relationship, that a cyclic shift corresponding to the {ACK, NACK} is the second cyclic shift.

Because the channel resource corresponding to the NACK in the second mapping relationship is the same as the channel resource corresponding to the {NACK, NACK} in the first mapping relationship, even if detection of the second PDCCH is missed, the network device considers that the second PDSCH is transmitted incorrectly, and then retransmits the second PDSCH, thereby ensuring correctness of the second PDSCH. According to the method, no new PUCCH resource needs to be reserved for an SR, and compared with an LTE system, a system using the method reduces PUCCH resource overheads.

Step S202: The terminal device generates an uplink signal based on the channel resource corresponding to the HARQ-ACK information.

When the channel resource corresponding to the HARQ-ACK information is a cyclic shift, the terminal device generates a sequence based on the cyclic shift corresponding to the HARQ-ACK information.

Step S203: The terminal device sends the uplink signal.

In this embodiment, when the SR transmission status is negative SR transmission, the terminal device determines, based on the HARQ-ACK information and the first mapping relationship, the channel resource corresponding to the HARQ-ACK information, when the SR transmission status is positive SR transmission, the terminal device determines, based on the HARQ-ACK information and the second mapping relationship, the channel resource corresponding to the HARQ-ACK information.

In this embodiment, the channel resource corresponding to the NACK in the second mapping relationship and the channel resource corresponding to the {NACK, NACK} in the first mapping relationship are configured to be the same, and the channel resource corresponding to the ACK in the second mapping relationship and the channel resource corresponding to the {ACK, NACK} in the first mapping relationship are configured to be the same. When a first PDCCH is correctly received and detection of a second PDCCH is missed, the terminal device sends the uplink signal to a network device based on the channel resource corresponding to the ACK. Correspondingly, the network device determines the HARQ-ACK information based on the channel resource corresponding to the ACK and the quantity of HARQ-ACK information bits corresponding to the channel resource, and performs processing such as retransmission based on the HARQ-ACK information, thereby ensuring that the terminal device correctly receives a second PDSCH. In addition, according to the method, no new PUCCH resource needs to be reserved for an SR, and compared with an LTE system, a system using the method reduces PUCCH resource overheads.

Figure 5:
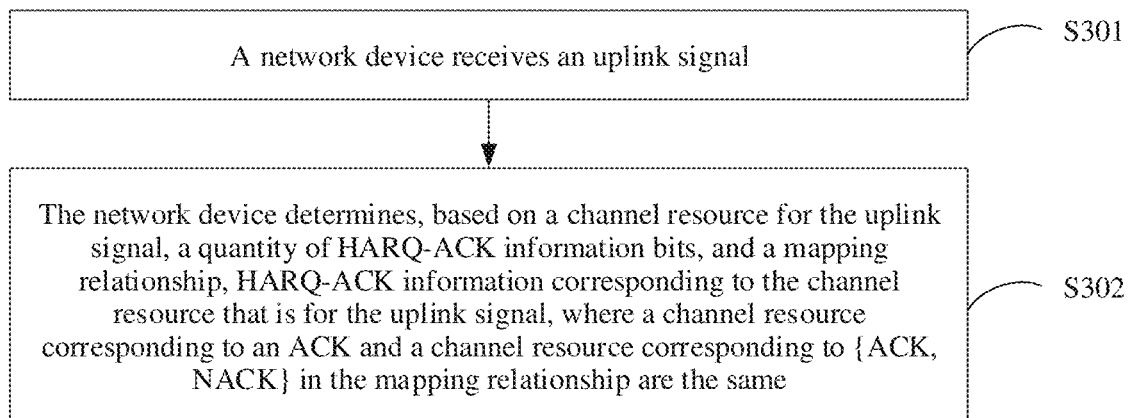
FIG. 5 is a flowchart of an uplink control information transmission method according to Embodiment 3 of the present invention.

FIG. 5 is a flowchart of an uplink control information transmission method according to Embodiment 3 of the present invention. This embodiment describes the method from a perspective of a network device. As shown in FIG. 5, the method provided in this embodiment includes the following steps.

Step S301: The network device receives an uplink signal.

After sending a first PDCCH and a second PDCCH to a terminal device, the network device receives, the network device receives the uplink signal sent by the terminal device, where the uplink signal carries HARQ-ACK information, or the uplink signal further carries a positive SR.

Step S302: The network device determines, based on a channel resource for the uplink signal, a quantity of HARQ-ACK information bits, and a mapping relationship, HARQ-ACK information corresponding to the channel resource that is for the uplink signal, where a channel resource corresponding to an ACK and a channel resource corresponding to {ACK, NACK} in the mapping relationship are the same.

The quantity of HARQ-ACK information bits is determined by a quantity of PDCCHs sent by the network device. The network device determines the quantity of HARQ-ACK information bits based on the quantity of PDCCHs sent by the network device. The quantity of HARQ-ACK information bits is 1 or 2. For example, if the network device sends two PDCCHs to the terminal device, the quantity of HARQ-ACK information bits is 2. If the network device sends one PDCCH to the terminal device, the quantity of HARQ-ACK information bits is 1.

The mapping relationship may be preconfigured in the network device. Optionally, after configuring the mapping relationship, the network device sends the mapping relationship to the terminal device by using signaling. For example, the network device sends the mapping relationship to the terminal device by using an RRC message. Alternatively, a plurality of mapping relationships are predefined in a standard, and the network device indicates, by using signaling, a mapping relationship currently used by the terminal device.

Optionally, the channel resource in the mapping relationship includes at least a first PUCCH resource and a second PUCCH resource. The mapping relationship includes: the ACK corresponds to the second PUCCH resource, and the {ACK, NACK} corresponds to the second PUCCH resource. Correspondingly, that the network device determines, based on a channel resource for the uplink signal, a quantity of HARQ-ACK information bits, and a mapping relationship, HARQ-ACK information corresponding to the channel resource that is for the uplink signal is specifically: when the channel resource for the uplink signal is the second PUCCH resource, and the quantity of HARQ-ACK information bits is 1, the network device determines, based on the mapping relationship, that the HARQ-ACK information corresponding to the channel resource that is for the uplink signal is the ACK, when the channel resource for the uplink signal is the second PUCCH resource, and the quantity of HARQ-ACK information bits is 2, the network device determines, based on the mapping relationship, that the HARQ-ACK information corresponding to the channel resource that is for the uplink signal is {ACK, NACK}.

Optionally, the channel resource in the mapping relationship includes at least a first SR PUCCH resource, a second SR PUCCH resource, a first PUCCH, and a second PUCCH. The mapping relationship includes: the ACK corresponds to the second SR PUCCH resource and the {ACK, NACK} corresponds to the second SR PUCCH resource when the SR transmission status is positive SR transmission, the ACK corresponds to the second PUCCH resource and the {ACK, NACK} corresponds to the second PUCCH resource when the SR transmission status is negative SR transmission. Correspondingly, that the network device determines, based on a channel resource for the uplink signal, a quantity of HARQ-ACK information bits, and a mapping relationship, HARQ-ACK information corresponding to the channel resource that is for the uplink signal is specifically: when the channel resource for the uplink signal is the second SR PUCCH resource and the quantity of HARQ-ACK information bits is 1, the network device determines, based on the mapping relationship, that the HARQ-ACK information corresponding to the channel resource that is for the uplink signal is the ACK and the SR transmission status is positive SR transmission, when the channel resource for the uplink signal is the second SR PUCCH resource and the quantity of HARQ-ACK information bits is 2, the network device determines, based on the mapping relationship, that the HARQ-ACK information corresponding to the channel resource that is for the uplink signal is the {ACK, NACK} and the SR transmission status is positive SR transmission, when the channel resource used for the uplink signal is the second PUCCH resource and the quantity of HARQ-ACK information bits is 1, the network device determines, based on the mapping relationship, that the HARQ-ACK information corresponding to the channel resource used for the uplink signal is the ACK and the SR transmission status is negative SR transmission, or when the channel resource used for the uplink signal is the second PUCCH resource and the quantity of HARQ-ACK information bits is 2, the network device determines, based on the mapping relationship, that the HARQ-ACK information corresponding to the channel resource that is for the uplink signal is the {ACK, NACK} and the SR transmission status is negative SR transmission.

Optionally, the mapping relationship meets Table 1 to Table 3. Details are not described herein again.

Optionally, the channel resource corresponding to the HARQ-ACK information is a cyclic shift corresponding to the HARQ-ACK information, and cyclic shifts in the mapping relationship include at least a first cyclic shift and a second cyclic shift. The mapping relationship includes: the ACK corresponds to the second cyclic shift, and the {ACK, NACK} corresponds to the second cyclic shift. That the network device determines, based on a channel resource for the uplink signal, a quantity of HARQ-ACK information bits, and a mapping relationship, HARQ-ACK information corresponding to the channel resource that is for the uplink signal is specifically: when a cyclic shift for the uplink signal is the second cyclic shift and the quantity of HARQ-ACK information bits is 1, the network device determines, based on the mapping relationship, that HARQ-ACK information corresponding to the cyclic shift for the uplink signal is the ACK, or when a cyclic shift for the uplink signal is the second cyclic shift and the quantity of HARQ-ACK information bits is 2, the network device determines, based on the mapping relationship, that HARQ-ACK information corresponding to the cyclic shift for the uplink signal is the {ACK, NACK}.

Optionally, the mapping relationship is a mapping relationship 1 or a mapping relationship 2, where the mapping relationship 1 meets Table 4 and Table 5, and the mapping relationship 2 meets Table 6 and Table 7. Further, the mapping relationship may further include a mapping relationship 3, a mapping relationship 4, a mapping relationship 5, and a mapping relationship 6. The mapping relationship 3 meets Table 4 and Table 8, the mapping relationship 4 meets Table 6 and Table 9, the mapping relationship 5 meets Table 10 and Table 11, and the mapping relationship 6 meets Table 10 and Table 12. Correspondingly, before the network device receives the uplink signal, the network device sends indication information to the terminal device, where the indication information indicates that the mapping relationship is any one of the mapping relationship 1 to the mapping relationship 6.

Optionally, cyclic shifts in the mapping relationship include at least a first SR PUCCH cyclic shift, a second SR PUCCH cyclic shift, a first PUCCH cyclic shift, and a second PUCCH cyclic shift. The mapping relationship includes: the ACK corresponds to the second SR PUCCH cyclic shift and the {ACK, NACK} corresponds to the second SR PUCCH shift when the SR transmission status is positive SR transmission, the ACK corresponds to the second PUCCH cyclic shift and the {ACK, NACK} corresponds to the second PUCCH cyclic shift when the SR transmission status is negative SR transmission.

Optionally, when the SR transmission status is negative SR transmission, the correspondence between the HARQ-ACK information and the cyclic shift meets Table 4 and Table 5, when the SR transmission status is positive SR transmission, the correspondence between the HARQ-ACK information and the cyclic shift meets Table 13 and Table 14.

It should be noted that the mapping relationship in this embodiment is the same as the mapping relationship in Embodiment 1. For specific details, refer to the description in Embodiment 1. Details are not described herein again.

Figure 6:
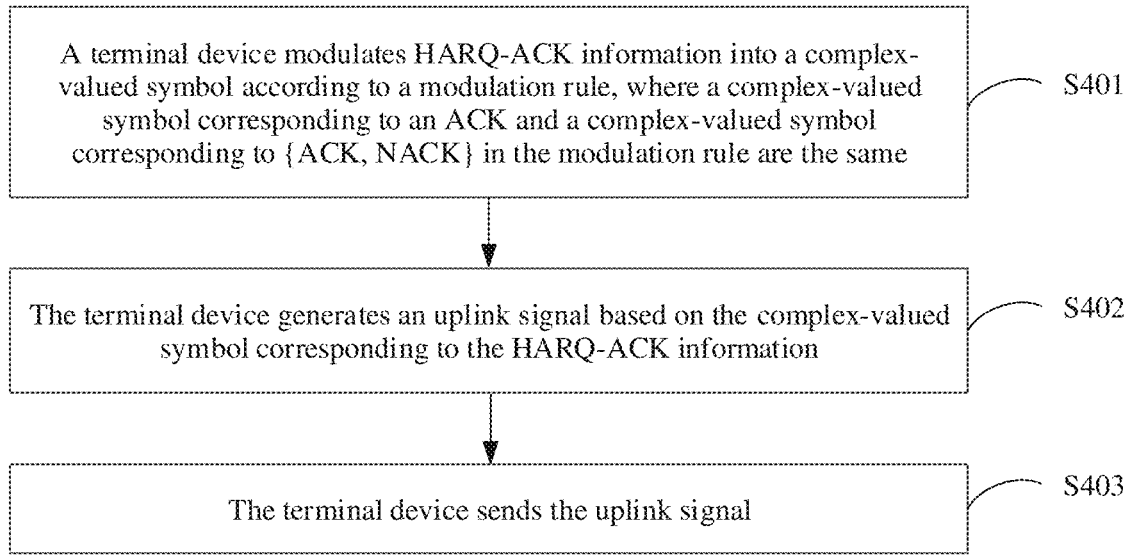
FIG. 6 is a flowchart of an uplink control information transmission method according to Embodiment 4 of this application.

To resolve the problem that the second PDSCH fails to be received because the ACK and the {ACK, ACK} correspond to a same complex-valued symbol in the scenario 2B, Embodiment 4 of this application provides an uplink control information transmission method. FIG. 6 is a flowchart of the uplink control information transmission method according to Embodiment 4 of this application. As shown in FIG. 6, the method provided in this embodiment includes the following steps.

Step S401: A terminal device modulates HARQ-ACK information into a complex-valued symbol according to a modulation rule, where a complex-valued symbol corresponding to an ACK and a complex-valued symbol corresponding to {ACK, NACK} in the modulation rule are the same.

Optionally, before step S101, the terminal device needs to determine the HARQ-ACK information. For details, refer to the description in Embodiment 1. Details are not described herein again.

Specifically, the complex-valued symbol corresponding to the ACK and the complex-valued symbol corresponding to the {ACK, NACK} in the modulation rule are the same, and a complex-valued symbol corresponding to a NACK and a complex-valued symbol corresponding to {NACK, NACK} in the modulation rule are the same. It should be noted that the modulation rule may be represented by using one or more tables, or the modulation rule may be represented by using one or more calculation formulas. This is not limited in the present invention.

Optionally, the modulation rule includes: the complex-valued symbol corresponding to the NACK is $$x = \frac{1}{\sqrt{2}}[1+j],$$

the complex-valued symbol corresponding to the ACK is $$x = \frac{1}{\sqrt{2}}[-1-j],$$

the complex-valued symbol corresponding to the {NACK, NACK} is $$x = \frac{1}{\sqrt{2}}[1+j],$$

and the complex-valued symbol corresponding to the {ACK, NACK} is $$x = \frac{1}{\sqrt{2}}[-1-j].$$

Optionally, the modulation rule includes: a complex-valued symbol corresponding to {NACK, ACK} is $$x = \frac{1}{\sqrt{2}}[1-j],$$

and a complex-valued symbol corresponding to {ACK, ACK} is $$x = \frac{1}{\sqrt{2}}[-1+j],$$

or includes: a complex-valued symbol corresponding to {NACK, ACK} is $$x = \frac{1}{\sqrt{2}}[-1+j],$$

and a complex-valued symbol corresponding to {ACK, ACK} is $$x = \frac{1}{\sqrt{2}}[1-j].$$

In this case, that a terminal device modulates HARQ-ACK information into a complex-valued symbol according to the HARQ-ACK information and a modulation rule is specifically: when the HARQ-ACK information is the ACK, the terminal device modulates the ACK $$x = \frac{1}{\sqrt{2}}[-1-j]$$

into according to the modulation rule, or when the HARQ-ACK information is the {ACK, NACK}, the terminal device modulates the {ACK, NACK} into $$x = \frac{1}{\sqrt{2}}[-1-j]$$

cording to the modulation rule. Other correspondences between complex-valued symbols and the HARQ-ACK information are deduced similarly. Details are not described herein again.

Optionally, the modulation rule includes: the complex-valued symbol corresponding to the NACK is $$x = \frac{1}{\sqrt{2}}[-1-j],$$

the complex-valued symbol corresponding to the ACK is $$x = \frac{1}{\sqrt{2}}[1+j],$$

the complex-valued symbol corresponding to the {NACK, NACK} is $$x = \frac{1}{\sqrt{2}}[-1-j],$$

and the complex-valued symbol corresponding to the {ACK, NACK} is $$x = \frac{1}{\sqrt{2}}[1+j].$$

Optionally, a complex-valued symbol corresponding to {NACK, ACK} is $$x = \frac{1}{\sqrt{2}}[1-j],$$

and a complex-valued symbol corresponding to {ACK, ACK} is $$x = \frac{1}{\sqrt{2}}[-1+j],$$

or a complex-valued symbol corresponding to {NACK, ACK} is $$x = \frac{1}{\sqrt{2}}[-1+j],$$

and a complex-valued symbol corresponding to {ACK, ACK} is $$x = \frac{1}{\sqrt{2}}[1-j].$$

Optionally, the modulation rule includes: the complex-valued symbol corresponding to the NACK is 1, the complex-valued symbol corresponding to the ACK is −1, the complex-valued symbol corresponding to the {NACK, NACK} is 1, and the complex-valued symbol corresponding to the {ACK, NACK} is −1. Optionally, a complex-valued symbol corresponding to {NACK, ACK} is −j, and a complex-valued symbol corresponding to {ACK, ACK} is j, or a complex-valued symbol corresponding to {NACK, ACK} is j, and a complex-valued symbol corresponding to {ACK, ACK} is −j.

Optionally, the modulation rule includes: the complex-valued symbol corresponding to the NACK is −1, the complex-valued symbol corresponding to the ACK is 1, the complex-valued symbol corresponding to the {NACK, NACK} is −1, and the complex-valued symbol corresponding to the {ACK, NACK} is 1. Optionally, a complex-valued symbol corresponding to {NACK, ACK} is −j, and a complex-valued symbol corresponding to {ACK, ACK} is j, or a complex-valued symbol corresponding to {NACK, ACK} is j, and a complex-valued symbol corresponding to {ACK, ACK} is −j.

Step S402: The terminal device generates an uplink signal based on the complex-valued symbol corresponding to the HARQ-ACK information.

Optionally, according to TS 38.211, the terminal device multiplies the complex-valued symbol by a sequence $r_{u,v}^{(\alpha)}(n)$ to generate a block of complex-valued symbols $y(0), \ldots, y(N_{sc}^{RB}-1)$, next, performs block-wise spread on the block of complex-valued symbols by using an orthogonal sequence $w^i(m)$ to form a sequence $z(n)$, and multiplies the sequence $z(n)$ by an amplitude factor, then, maps a result to a physical resource, and generates the uplink signal.

Step S403: The terminal device sends the uplink signal.

The terminal device sends the uplink signal to a network device, where the uplink signal carries the HARQ-ACK information. Optionally, the terminal device sends the uplink signal on a PUCCH resource or a PUSCH resource.

In this embodiment, the complex-valued symbol corresponding to the ACK and the complex-valued symbol corresponding to the {ACK, NACK} in the modulation rule are configured to be the same. When a first PDCCH is correctly received and detection of a second PDCCH is missed, the terminal device sends the complex-valued symbol corresponding to the ACK to a network device. Correspondingly, the network device determines the HARQ-ACK information based on the complex-valued symbol corresponding to the ACK and a quantity of HARQ-ACK information bits corresponding to the complex-valued symbol, and performs processing such as retransmission based on the HARQ-ACK information, thereby ensuring that the terminal device correctly receives a second PDSCH.

Figure 7:
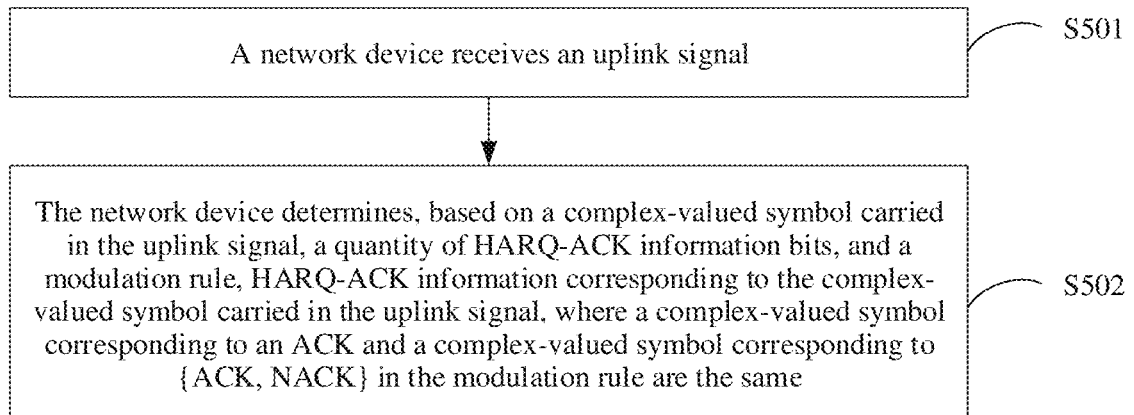
FIG. 7 is a flowchart of an uplink control information transmission method according to Embodiment 5 of this application.

FIG. 7 is a flowchart of an uplink control information transmission method according to Embodiment 5 of this application. This embodiment describes the method from a perspective of a network device. As shown in FIG. 7, the method provided in this embodiment includes the following steps.

Step S501: The network device receives an uplink signal.

Optionally, the network device receives the uplink signal on a PUCCH resource or a PUSCH resource, where the uplink signal carries HARQ-ACK information.

Step S502: The network device determines, based on a complex-valued symbol carried in the uplink signal, a quantity of HARQ-ACK information bits, and a modulation rule, the HARQ-ACK information corresponding to the complex-valued symbol carried in the uplink signal, where a complex-valued symbol corresponding to an ACK and a complex-valued symbol corresponding to {ACK, NACK} in the modulation rule are the same.

It should be noted that the modulation rule is the same as that in Embodiment 4. Details are not described herein again.

Optionally, step S502 is specifically: when the complex-valued symbol carried in the uplink signal is $$x = \frac{1}{\sqrt{2}}[-1-j]$$

and the quantity of HARQ-ACK information bits is 1, the network device determines, according to the modulation rule, that the HARQ-ACK information carried in the uplink signal is the ACK, or when the complex-valued symbol carried in the uplink signal is $$x = \frac{1}{\sqrt{2}}[-1-j]$$

and the quantity of HARQ-ACK information bits is 2, the network device determines, according to the modulation rule, that the HARQ-ACK information carried in the uplink signal is the {ACK, NACK}. Other correspondences between complex-valued symbols and the HARQ-ACK information are deduced similarly. Details are not described herein again.

Figure 8:
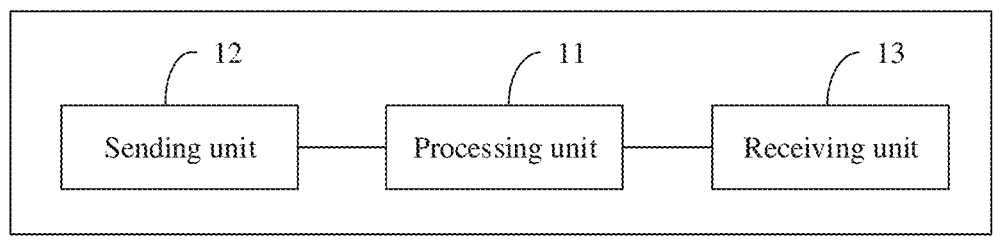
FIG. 8 is a schematic structural diagram of a communications device according to Embodiment 6 of this application.

FIG. 8 is a schematic structural diagram of a communications device according to Embodiment 6 of this application. The communications device may be a terminal device. As shown in FIG. 8, the communications device includes: a processing unit 11, configured to determine, based on hybrid automatic repeat request-acknowledgment HARQ-ACK information and a mapping relationship, a channel resource corresponding to the HARQ-ACK information, where a channel resource corresponding to an ACK and a channel resource corresponding to {ACK, NACK} in the mapping relationship are the same, where the processing unit 11 is further configured to generate an uplink signal based on the channel resource corresponding to the HARQ-ACK information, and a sending unit 12, configured to send the uplink signal.

Optionally, the channel resource in the mapping relationship includes at least a first physical uplink control channel PUCCH resource and a second PUCCH resource. The mapping relationship includes: the ACK corresponds to the second PUCCH resource, and the {ACK, NACK} corresponds to the second PUCCH resource. Correspondingly, the processing unit 11 is specifically configured to: when the HARQ-ACK information is the ACK, determine, based on the ACK and the mapping relationship, that the channel resource corresponding to the ACK is the second PUCCH resource, or when the HARQ-ACK information is the {ACK, NACK}, determine, based on the {ACK, NACK} and the mapping relationship, that the channel resource corresponding to the {ACK, NACK} is the second PUCCH resource.

Optionally, the channel resource in the mapping relationship includes at least a first scheduling request SR physical uplink control channel PUCCH resource, a second SR PUCCH resource, a first PUCCH, and a second PUCCH. The mapping relationship includes: the ACK corresponds to the second SR PUCCH resource and the {ACK, NACK} corresponds to the second SR PUCCH resource when an SR transmission status is positive SR transmission, and the ACK corresponds to the second PUCCH resource and the {ACK, NACK} corresponds to the second PUCCH resource when the SR transmission status is negative SR transmission. Correspondingly, the processing unit 11 is specifically configured to: when the HARQ-ACK information is the ACK and the SR transmission status is positive SR transmission, determine, based on the mapping relationship, that the channel resource corresponding to the ACK is the second SR PUCCH resource, when the HARQ-ACK information is the {ACK, NACK} and the SR transmission status is positive SR transmission, determine, based on the mapping relationship, that the channel resource corresponding to the {ACK, NACK} is the second SR PUCCH resource, when the HARQ-ACK information is the ACK and the SR transmission status is negative SR transmission, determine, based on the mapping relationship, that the channel resource corresponding to the ACK is the second PUCCH resource, or when the HARQ-ACK information is the {ACK, NACK} and the SR transmission status is negative SR transmission, determine, based on the mapping relationship, that the channel resource corresponding to the {ACK, NACK} is the second PUCCH resource.

Optionally, the mapping relationship meets Table 1 to Table 3.

Optionally, the channel resource corresponding to the HARQ-ACK information is a cyclic shift corresponding to the HARQ-ACK information, and cyclic shifts in the mapping relationship include at least a first cyclic shift and a second cyclic shift. The mapping relationship includes: the ACK corresponds to the second cyclic shift, and the {ACK, NACK} corresponds to the second cyclic shift. Correspondingly, the processing unit 11 is specifically configured to: when the HARQ-ACK information is the ACK, determine, based on the mapping relationship, that a cyclic shift corresponding to the ACK is the second cyclic shift, or when the HARQ-ACK information is the {ACK, NACK}, determine, based on the mapping relationship, that a cyclic shift corresponding to the {ACK, NACK} is the second cyclic shift.

Optionally, the mapping relationship is a mapping relationship 1 or a mapping relationship 2, where the mapping relationship 1 meets Table 4 and Table 5, and the mapping relationship 2 meets Table 6 and Table 7. Correspondingly, the terminal device further includes a receiving unit 13, configured to receive indication information sent by a network device, where the indication information indicates that the mapping relationship is the mapping relationship 1 or the mapping relationship 2.

The communications device in this embodiment may be configured to perform the method steps performed by the terminal device in Embodiment 1. Specific implementations and technical effects are similar to those in Embodiment 1, and details are not described herein again.

Figure 9:
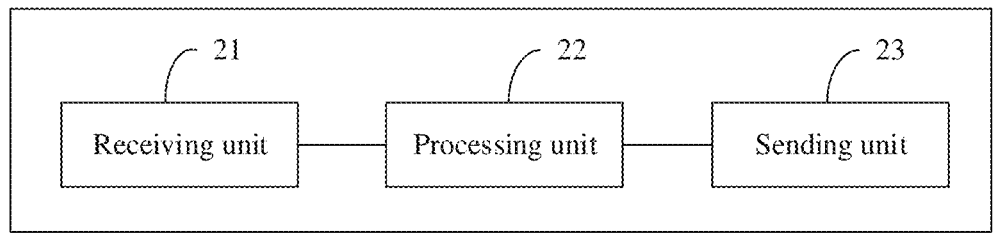
FIG. 9 is a schematic structural diagram of a network device according to Embodiment 7 of this application.

FIG. 9 is a schematic structural diagram of a network device according to Embodiment 7 of this application. As shown in FIG. 9, the network device provided in this embodiment includes: a receiving unit 21, configured to receive an uplink signal, and a processing unit 22, configured to determine, based on a channel resource for the uplink signal, a quantity of hybrid automatic repeat request-acknowledgment HARQ-ACK information bits, and a mapping relationship, HARQ-ACK information corresponding to the channel resource that is for the uplink signal, where a channel resource corresponding to an ACK and a channel resource corresponding to {ACK, NACK} in the mapping relationship are the same.

Optionally, the quantity of HARQ-ACK information bits is 1 or 2. The channel resource in the mapping relationship includes at least a first physical uplink control channel PUCCH resource and a second PUCCH resource. The mapping relationship includes: the ACK corresponds to the second PUCCH resource, and the {ACK, NACK} corresponds to the second PUCCH resource. Correspondingly, the processing unit 21 is specifically configured to: when the channel resource for the uplink signal is the second PUCCH resource, and the quantity of HARQ-ACK information bits is 1, determine, based on the mapping relationship, that the HARQ-ACK information corresponding to the channel resource that is for the uplink signal is the ACK, or when the channel resource for the uplink signal is the second PUCCH resource, and the quantity of HARQ-ACK information bits is 2, determine, based on the mapping relationship, that the HARQ-ACK information corresponding to the channel resource that is for the uplink signal is the {ACK, NACK}.

Optionally, the quantity of HARQ-ACK information bits is 1 or 2. The channel resource in the mapping relationship includes at least a first scheduling request SR physical uplink control channel PUCCH resource, a second SR PUCCH resource, a first PUCCH, and a second PUCCH. The mapping relationship includes: the ACK corresponds to the second SR PUCCH resource and the {ACK, NACK} corresponds to the second SR PUCCH resource when an SR transmission status is positive SR transmission, and the ACK corresponds to the second PUCCH resource and the {ACK, NACK} corresponds to the second PUCCH resource when the SR transmission status is negative SR transmission. Correspondingly, the processing unit 21 is specifically configured to:

when the channel resource for the uplink signal is the second SR PUCCH resource, and the quantity of HARQ-ACK information bits is 1, determine, based on the mapping relationship, that the HARQ-ACK information corresponding to the channel resource that is for the uplink signal is the ACK and the SR transmission status is positive SR transmission, when the channel resource for the uplink signal is the second SR PUCCH resource, and the quantity of HARQ-ACK information bits is 2, determine, based on the mapping relationship, that the HARQ-ACK information corresponding to the channel resource that is for the uplink signal is the {ACK, NACK} and the SR transmission status is positive SR transmission, when the channel resource used for the uplink signal is the second PUCCH resource, and the quantity of HARQ-ACK information bits is 1, determine, based on the mapping relationship, that the HARQ-ACK information corresponding to the channel resource used for the uplink signal is the ACK and the SR transmission status is negative SR transmission, or when the channel resource used for the uplink signal is the second PUCCH resource, and the quantity of HARQ-ACK information bits is 2, determine, based on the mapping relationship, that the HARQ-ACK information corresponding to the channel resource that is for the uplink signal is the {ACK, NACK} and the SR transmission status is negative SR transmission.

Optionally, the mapping relationship meets Table 1 to Table 3.

Optionally, the channel resource corresponding to the HARQ-ACK information is a cyclic shift corresponding to the HARQ-ACK information, and cyclic shifts in the mapping relationship include at least a first cyclic shift and a second cyclic shift. The mapping relationship includes: the ACK corresponds to the second cyclic shift, and the {ACK, NACK} corresponds to the second cyclic shift. Correspondingly, the processing unit 21 is specifically configured to: when a cyclic shift for the uplink signal is the second cyclic shift and the quantity of HARQ-ACK information bits is 1, determine, based on the mapping relationship, that HARQ-ACK information corresponding to the cyclic shift for the uplink signal is the ACK, or when a cyclic shift for the uplink signal is the second cyclic shift and the quantity of HARQ-ACK information bits is 2, determine, based on the mapping relationship, that HARQ-ACK information corresponding to the cyclic shift for the uplink signal is the {ACK, NACK}.

Optionally, the mapping relationship is a mapping relationship 1 or a mapping relationship 2, where the mapping relationship 1 meets Table 4 and Table 5, and the mapping relationship 2 meets Table 6 and Table 7. Correspondingly, the network device further includes a sending unit 23, configured to send indication information to a terminal device, where the indication information indicates that the mapping relationship is the mapping relationship 1 or the mapping relationship 2.

The network device in this embodiment may be configured to perform the method steps performed by the network device in Embodiment 1 to Embodiment 3. Specific implementations and technical effects are similar to those in Embodiment 1 to Embodiment 3, and details are not described herein again.

Figure 10:
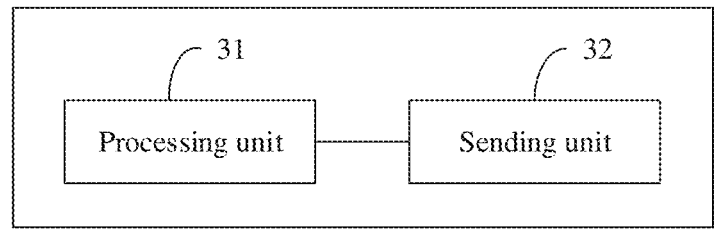
FIG. 10 is a schematic structural diagram of a communications device according to Embodiment 8 of this application.

FIG. 10 is a schematic structural diagram of a communications device according to Embodiment 8 of this application. The communications device may be a terminal device. As shown in FIG. 10, the communications device includes: a processing unit 31, configured to: when an SR transmission status is negative SR transmission, determine, based on HARQ-ACK information and a first mapping relationship, a channel resource corresponding to the HARQ-ACK information, where the first mapping relationship includes a correspondence that is between the HARQ-ACK information and the channel resource and that exists when the SR transmission status is negative SR transmission, where the processing unit 31 is further configured to: when an SR transmission status is positive SR transmission, determine, based on HARQ-ACK information and a second mapping relationship, a channel resource corresponding to the HARQ-ACK information, where the second mapping relationship includes a correspondence that is between the HARQ-ACK information and the channel resource and that exists when the SR transmission status is positive SR transmission, a channel resource corresponding to a NACK in the second mapping relationship is the same as a channel resource corresponding to {NACK, NACK} in the first mapping relationship, and a channel resource corresponding to an ACK in the second mapping relationship is the same as a channel resource corresponding to {ACK, NACK} in the first mapping relationship, and the processing unit 31 is further configured to generate an uplink signal based on the channel resource corresponding to the HARQ-ACK information, and a sending unit 32, configured to send the uplink signal.

In a possible implementation, an ACK and the {ACK, NACK} in the first mapping relationship correspond to a same channel resource.

In a possible implementation, the channel resource corresponding to the HARQ-ACK information is a cyclic shift corresponding to the HARQ-ACK information, and cyclic shifts in the second mapping relationship include at least a first cyclic shift and a second cyclic shift. The second mapping relationship includes: the NACK corresponds to the first cyclic shift, and the ACK corresponds to the second cyclic shift. Correspondingly, the processing unit 31 is specifically configured to: when the HARQ-ACK information is the NACK and the SR transmission status is positive SR transmission, determine, based on the second mapping relationship, that a cyclic shift corresponding to the NACK is the first cyclic shift, or when the HARQ-ACK information is the ACK and the SR transmission status is positive SR transmission, determine, based on the second mapping relationship, that a cyclic shift corresponding to the ACK is the second cyclic shift.

In a possible implementation, cyclic shifts in the first mapping relationship include at least the first cyclic shift and the second cyclic shift. The first mapping relationship includes: the ACK corresponds to the second cyclic shift, and the {ACK, NACK} corresponds to the second cyclic shift. Correspondingly, the processing unit 31 is specifically configured to: when the HARQ-ACK information is the NACK, determine, based on the first mapping relationship, that a cyclic shift corresponding to the NACK is the first cyclic shift, when the HARQ-ACK information is the ACK, determine, based on the first mapping relationship, that a cyclic shift corresponding to the ACK is the second cyclic shift, when the HARQ-ACK information is the {NACK, NACK}, determine, based on the first mapping relationship, that a cyclic shift corresponding to the {NACK, NACK} is the first cyclic shift, or when the HARQ-ACK information is the {ACK, NACK}, determine, based on the first mapping relationship, that a cyclic shift corresponding to the {ACK, NACK} is the second cyclic shift.

The communications device in this embodiment may be configured to perform the method steps performed by the terminal device in Embodiment 2. Specific implementations and technical effects are similar to those in Embodiment 2, and details are not described herein again.

Figure 11:
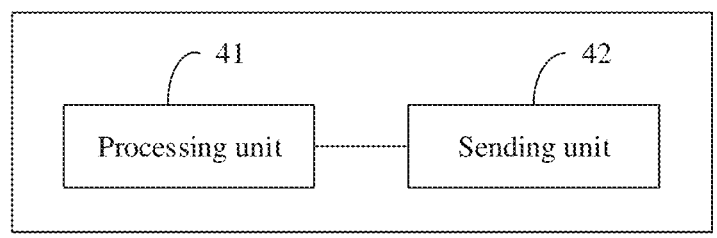
FIG. 11 is a schematic structural diagram of a communications device according to Embodiment 9 of this application.

FIG. 11 is a schematic structural diagram of a communications device according to Embodiment 9 of this application. The communications device may be a terminal device. As shown in FIG. 11, the communications device includes: a processing unit 41, configured to modulate HARQ-ACK information into a complex-valued symbol according to a modulation rule, where a complex-valued symbol corresponding to an ACK and a complex-valued symbol corresponding to {ACK, NACK} in the modulation rule are the same, where the processing unit 41 is further configured to generate an uplink signal based on the complex-valued symbol corresponding to the HARQ-ACK information, and a sending unit 42, configured to send the uplink signal.

The communications device in this embodiment may be configured to perform the method steps performed by the terminal device in Embodiment 4. Specific implementations and technical effects are similar to those in Embodiment 4, and details are not described herein again.

Figure 12:
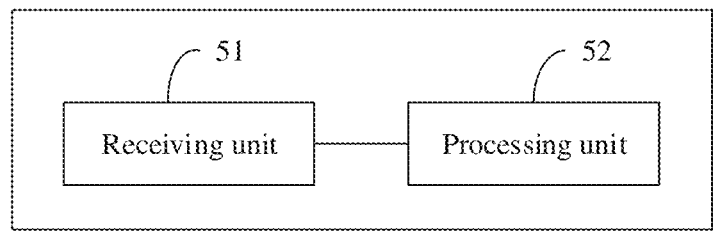
FIG. 12 is a schematic structural diagram of a network device according to Embodiment 10 of this application.

FIG. 12 is a schematic structural diagram of a network device according to Embodiment 10 of this application. As shown in FIG. 12, the network device includes: a receiving unit 51, configured to receive an uplink signal, and a processing unit 52, configured to determine, based on a complex-valued symbol carried in the uplink signal, a quantity of HARQ-ACK information bits, and a modulation rule, HARQ-ACK information corresponding to the complex-valued symbol carried in the uplink signal, where a complex-valued symbol corresponding to an ACK and a complex-valued symbol corresponding to {ACK, NACK} in the modulation rule are the same.

The network device in this embodiment may be configured to perform the method steps performed by the network device in Embodiment 5. Specific implementations and technical effects are similar to those in Embodiment 5, and details are not described herein again.

In Embodiment 6 to Embodiment 10, the processing unit may be a processor, the sending unit may be a transmitter, and the receiving unit may be a receiver. The transmitter and the receiver may be a wireless transceiver, and the transceiver implements corresponding functions by using an antenna. The transmitter and the receiver may alternatively be interfaces or communications interfaces.

Embodiment 11 of this application provides a computer-readable storage medium, applied to a terminal device. The computer-readable storage medium stores an instruction. When the instruction is executed by a computing apparatus, the terminal device is enabled to perform the method steps performed by the terminal device in Embodiment 1 to Embodiment 5. Specific implementations and technical effects are similar to those in Embodiment 1 to Embodiment 5, and details are not described herein again.

Embodiment 12 of this application provides a computer-readable storage medium, applied to a network device. The computer-readable storage medium stores an instruction. When the instruction is executed by a computing apparatus, the network device is enabled to perform the method steps performed by the network device in Embodiment 1 to Embodiment 5. Specific implementations and technical effects are similar to those in Embodiment 1 to Embodiment 5, and details are not described herein again.

Embodiment 13 of this application provides a communications system. The communications system includes the communications device and the network device that are provided in the apparatus embodiments.

The processor in the embodiments may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in the embodiments of the present invention. The general-purpose processor may be a microprocessor, or the processor may be any conventional processor or the like. The steps of the methods disclosed in the embodiments of the present invention may be directly performed and completed by a hardware decoding processor, or may be performed and completed by using a combination of hardware and software modules in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads instructions in the memory and completes the steps of the foregoing methods in combination with hardware of the processor.

In the several embodiments provided in this application, it should be understood that the disclosed apparatuses and methods may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

What is claimed is:

1. An uplink control information transmission method, comprising:
    determining, by a terminal device, according to hybrid automatic repeat request-acknowledgment (HARQ-ACK) information and a mapping relationship, a channel resource corresponding to the HARQ-ACK information, wherein a channel resource corresponding to an acknowledgement (ACK) and a channel resource corresponding to {ACK, negative acknowledgement (NACK)} in the mapping relationship are the same, wherein the ACK is associated with the terminal device detecting one physical downlink control channel (PDCCH) of a first PDCCH and a second PDCCH sent by a network device, and is further associated with the terminal device not detecting another one of the first PDCCH and the second PDCCH, and wherein the {ACK, NACK} is associated with the terminal device detecting both the first PDCCH and the second PDCCH;
    generating, by the terminal device, an uplink signal based on the channel resource corresponding to the HARQ-ACK information; and
    sending, by the terminal device, the uplink signal.

2. The method according to claim 1, wherein the channel resource in the mapping relationship comprises at least a first physical uplink control channel (PUCCH) resource and a second PUCCH resource, wherein the mapping relationship comprises the ACK corresponding to the second PUCCH resource, and wherein the {ACK, NACK} corresponds to the second PUCCH resource; and
    wherein the determining the channel resource corresponding to the HARQ-ACK information comprises performing at least one of:
        determining, by the terminal device, in response to the HARQ-ACK information being the ACK, and according to the ACK and the mapping relationship, that the channel resource corresponding to the ACK is the second PUCCH resource; or
        determining, by the terminal device, in response to the HARQ-ACK information being the {ACK, NACK}, and according to the {ACK, NACK} and the mapping relationship, that the channel resource corresponding to the {ACK, NACK} is the second PUCCH resource.

3. The method according to claim 1, wherein the channel resource in the mapping relationship comprises at least a first scheduling request (SR) physical uplink control channel (PUCCH) resource, a second SR PUCCH resource, a first PUCCH, and a second PUCCH, wherein the mapping relationship comprises the ACK corresponding to the second SR PUCCH resource and the {ACK, NACK} corresponding to the second SR PUCCH resource when an SR transmission status is a positive SR transmission, and further comprises the ACK corresponding to the second PUCCH resource and the {ACK, NACK} corresponding to the second PUCCH resource when the SR transmission status is a negative SR transmission; and
    wherein the determining the channel resource corresponding to the HARQ-ACK information comprises performing at least one of:
        determining, by the terminal device, in response to the HARQ-ACK information being the ACK and the SR transmission status being the positive SR transmission, and according to the mapping relationship, that the channel resource corresponding to the ACK is the second SR PUCCH resource;
        determining, by the terminal device, in response to the HARQ-ACK information being the {ACK, NACK} and the SR transmission status being the positive SR transmission, and according to the mapping relationship, that the channel resource corresponding to the {ACK, NACK} is the second SR PUCCH resource;
        determining, by the terminal device, in response to the HARQ-ACK information being the ACK and the SR transmission status being the negative SR transmission, according to the mapping relationship, that the channel resource corresponding to the ACK is the second PUCCH resource; or
    determining, by the terminal device, in response to the HARQ-ACK information being the {ACK, NACK} and the SR transmission status being the negative SR transmission, according to the mapping relationship, that the channel resource corresponding to the {ACK, NACK} is the second PUCCH resource.

4. The method according to claim 3, wherein the mapping relationship meets at least one of Table 1 to Table 3, and wherein Table 1 to Table 3 comprise:

TABLE 1

| sPUCCH format | HARQ-ACK information | PUCCH resource |
| --- | --- | --- |
| 1a | 0 | First PUCCH resource |
|  | 1 | Second PUCCH resource |

TABLE 1-continued

| sPUCCH format | HARQ-ACK information | PUCCH resource |
|---|---|---|
| 1b | 00 | First PUCCH resource |
| | 10 | Second PUCCH resource |
| | 01 | Third PUCCH resource |
| | 11 | Fourth PUCCH resource | wherein 1 indicates that the HARQ-ACK information is an ACK, and 0 indicates that the HARQ-ACK information is a NACK;

TABLE 2

| HARQ-ACK information | SR transmission status | PUCCH resource |
|---|---|---|
| ACK/NACK | Negative | PUCCH resource corresponding to the sPUCCH format 1a in Table 1 |
| NACK | Positive | First SR PUCCH resource |
| ACK | Positive | Second SR PUCCH resource |

TABLE 3

| HARQ-ACK information (0) | HARQ-ACK information (1) | SR transmission status | PUCCH resource |
|---|---|---|---|
| ACK/NACK | ACK/NACK | Negative | PUCCH resource corresponding to the sPUCCH format 1b in Table 1 |
| NACK | NACK | Positive | First SR PUCCH resource |
| ACK | NACK | Positive | Second SR PUCCH resource |
| NACK | ACK | Positive | Third SR PUCCH resource |
| ACK | ACK | Positive | Fourth SR PUCCH resource | wherein the correspondence between the HARQ-ACK information and the channel resource meets Table 1 when the SR transmission status is the negative SR transmission; and
wherein the correspondence between the HARQ-ACK information and the channel resource meets Table 2 and Table 3 when the SR transmission status is the positive SR transmission.

5. The method according to claim 1, wherein the channel resource corresponding to the HARQ-ACK information is a cyclic shift corresponding to the HARQ-ACK information, and wherein cyclic shifts in the mapping relationship comprise at least a first cyclic shift and a second cyclic shift;
wherein the mapping relationship comprises the ACK corresponding to the second cyclic shift, and wherein the {ACK, NACK} corresponds to the second cyclic shift; and
wherein the determining the channel resource corresponding to the HARQ-ACK information comprises performing at least one of:
determining, by the terminal device, in response to the HARQ-ACK information being the ACK, and according to the mapping relationship, that a cyclic shift corresponding to the ACK is the second cyclic shift; or
determining, by the terminal device, in response to the HARQ-ACK information being the {ACK, NACK}, and according to the mapping relationship, that a cyclic shift corresponding to the {ACK, NACK} is the second cyclic shift.

6. The method according to claim 5, wherein the mapping relationship is a mapping relationship 1 or a mapping relationship 2, wherein the mapping relationship 1 meets Table 4 and Table 5, wherein the mapping relationship 2 meets Table 6 and Table 7, and wherein Tables 4-7 comprise:

TABLE 4

| | HARQ-ACK information | |
|---|---|---|
| | 0 | 1 |
| Cyclic shift | $m_{cs} = 0$ | $m_{cs} = 6$ |

TABLE 5

| | HARQ-ACK information | | | |
|---|---|---|---|---|
| | {0, 0} | {0, 1} | {1, 0} | {1, 1} |
| Cyclic shift | $m_{cs} = 0$ | $m_{cs} = 3$ | $m_{cs} = 6$ | $m_{cs} = 9$ |

TABLE 6

| | HARQ-ACK information | |
|---|---|---|
| | 0 | 1 |
| Cyclic shift | $m_{cs} = 0$ | $m_{cs} = 9$ |

TABLE 7

| | HARQ-ACK information | | | |
|---|---|---|---|---|
| | {0, 0} | {0, 1} | {1, 1} | {1, 0} |
| Cyclic shift | $m_{cs} = 0$ | $m_{cs} = 3$ | $m_{cs} = 6$ | $m_{cs} = 9$ | wherein 1 indicates that the HARQ-ACK information is an ACK, and wherein 0 indicates that the HARQ-ACK information is a NACK.

7. The method according to claim 6, further comprising performing, before the determining the channel resource corresponding to the HARQ-ACK information:
receiving, by the terminal device, indication information sent by the network device, wherein the indication information indicates that the mapping relationship is the mapping relationship 1 or the mapping relationship 2.

8. An uplink control information transmission method, comprising:
receiving, by a network device, an uplink signal; and
determining, by the network device according to a channel resource for the uplink signal, a quantity of hybrid automatic repeat request-acknowledgment (HARQ-ACK) information bits and a mapping relationship, wherein HARQ-ACK information corresponds to the channel resource for the uplink signal, and wherein a channel resource corresponding to an acknowledgement (ACK) and a channel resource corresponding to {ACK, negative acknowledgement (NACK)} in the mapping relationship are the same, wherein the ACK is associated with a terminal device detecting one physical downlink control channel (PDCCH) of a first PDCCH and a second PDCCH sent by the network device, and is further associated with the terminal device not detecting another one of the first PDCCH and the second PDCCH, and wherein the {ACK, NACK} is associated with the terminal device detecting both the first PDCCH and the second PDCCH.

9. The method according to claim 8, wherein the quantity of HARQ-ACK information bits is 1 or 2, wherein the channel resource in the mapping relationship comprises at least a first physical uplink control channel (PUCCH) resource and a second PUCCH resource;
   wherein the mapping relationship comprises the ACK corresponding to the second PUCCH resource, and further comprises the {ACK, NACK} corresponding to the second PUCCH resource; and
   wherein the determining the quantity of HARQ-ACK information bits and the mapping relationship comprises performing at least one of:
      determining, by the network device, in response to the channel resource for the uplink signal being the second PUCCH resource, and further according to the quantity of HARQ-ACK information bits being 1, and according to the mapping relationship, that the HARQ-ACK information corresponding to the channel resource that is for the uplink signal is the ACK; or
   determining, by the network device, in response to the channel resource for the uplink signal being the second PUCCH resource, and the quantity of HARQ-ACK information bits being 2, and according to the mapping relationship, that the HARQ-ACK information corresponding to the channel resource that is for the uplink signal is the {ACK, NACK}.

10. The method according to claim 8, wherein the quantity of HARQ-ACK information bits is 1 or 2;
   wherein the channel resource in the mapping relationship comprises at least a first scheduling request (SR) physical uplink control channel (PUCCH) resource, a second SR PUCCH resource, a first PUCCH, and a second PUCCH;
   wherein the mapping relationship comprises:
      the ACK corresponding to the second SR PUCCH resource and the {ACK, NACK} corresponding to the second SR PUCCH resource when an SR transmission status is a positive SR transmission; and
      the ACK corresponding to the second PUCCH resource and the {ACK, NACK} corresponding to the second PUCCH resource when the SR transmission status is a negative SR transmission; and
   wherein the determining the quantity of HARQ-ACK information bits, and the mapping relationship comprises performing at least one of:
      determining, by the network device, in response to the channel resource for the uplink signal being the second SR PUCCH resource, further in response to the quantity of HARQ-ACK information bits being 1, and according to the mapping relationship, that the HARQ-ACK information corresponding to the channel resource that is for the uplink signal is the ACK and the SR transmission status is the positive SR transmission;
      determining, by the network device, in response to the channel resource for the uplink signal being the second SR PUCCH resource, further according to the quantity of HARQ-ACK information bits being 2, and according to the mapping relationship, that the HARQ-ACK information corresponding to the channel resource that is for the uplink signal is the {ACK, NACK} and the SR transmission status is the positive SR transmission;
      determining, by the network device, in response to the channel resource used for the uplink signal being the second PUCCH resource, further in response to the quantity of HARQ-ACK information bits being 1, and according to the mapping relationship, that the HARQ-ACK information corresponding to the channel resource used for the uplink signal is the ACK and the SR transmission status is the negative SR transmission; or
      determining, by the network device, in response to the channel resource used for the uplink signal being the second PUCCH resource, further in response to the quantity of HARQ-ACK information bits being 2, and according to the mapping relationship, that the HARQ-ACK information corresponding to the channel resource that is for the uplink signal is the {ACK, NACK} and the SR transmission status is the negative SR transmission.

11. The method according to claim 10, wherein the mapping relationship meets Table 1 to Table 3, and wherein Tables 1-3 comprise:

TABLE 1

| sPUCCH format | HARQ-ACK information | PUCCH resource |
|---|---|---|
| 1a | 0 | First PUCCH resource |
|  | 1 | Second PUCCH resource |
| 1b | 00 | First PUCCH resource |
|  | 10 | Second PUCCH resource |
|  | 01 | Third PUCCH resource |
|  | 11 | Fourth PUCCH resource | wherein 1 indicates that the HARQ-ACK information is an ACK, and 0 indicates that the HARQ-ACK information is a NACK;

TABLE 2

| HARQ-ACK information | SR transmission status | PUCCH resource |
|---|---|---|
| ACK/NACK | Negative | PUCCH resource corresponding to the sPUCCH format 1a in Table 1 |
| NACK | Positive | First SR PUCCH resource |
| ACK | Positive | Second SR PUCCH resource |

TABLE 3

| HARQ-ACK information (0) | HARQ-ACK information (1) | SR transmission status | PUCCH resource |
|---|---|---|---|
| ACK/NACK | ACK/NACK | Negative | PUCCH resource corresponding to the sPUCCH format 1b in Table 1 |
| NACK | NACK | Positive | First SR PUCCH resource |
| ACK | NACK | Positive | Second SR PUCCH resource |
| NACK | ACK | Positive | Third SR PUCCH resource |
| ACK | ACK | Positive | Fourth SR PUCCH resource | wherein the correspondence between the HARQ-ACK information and the channel resource meets Table 1 when the SR transmission status is the negative SR transmission, and wherein the correspondence between the HARQ-ACK information and the channel resource meets Table 2 and Table 3 when the SR transmission status is the positive SR transmission.

12. The method according to claim 8, wherein the channel resource corresponding to the HARQ-ACK information is a cyclic shift corresponding to the HARQ-ACK information, and wherein cyclic shifts in the mapping relationship comprise at least a first cyclic shift and a second cyclic shift;
   wherein the mapping relationship comprises the ACK corresponding to the second cyclic shift, and the {ACK, NACK} corresponding to the second cyclic shift; and
   wherein the determining the quantity of HARQ-ACK information bits, and the mapping relationship comprises performing at least one of:
      determining, by the network device, in response to a cyclic shift for the uplink signal being the second cyclic shift and the quantity of HARQ-ACK information bits being 1, and according to the mapping relationship, that HARQ-ACK information corresponding to the cyclic shift for the uplink signal is the ACK; or
      determining, by the network device, in response to a cyclic shift for the uplink signal being the second cyclic shift, in response to the quantity of HARQ-ACK information bits being 2, and according to the mapping relationship, that HARQ-ACK information corresponding to the cyclic shift for the uplink signal is the {ACK, NACK}.

13. The method according to claim 12, wherein the mapping relationship is a mapping relationship 1 or a mapping relationship 2, wherein the mapping relationship 1 meets Table 4 and Table 5, and the mapping relationship 2 meets Table 6 and Table 7, wherein Tables 4-7 comprise:

TABLE 4

|  | HARQ-ACK information | |
| --- | --- | --- |
|  | 0 | 1 |
| Cyclic shift | $m_{cs} = 0$ | $m_{cs} = 6$ |

TABLE 5

|  | HARQ-ACK information | | | |
| --- | --- | --- | --- | --- |
|  | {0, 0} | {0, 1} | {1, 0} | {1, 1} |
| Cyclic shift | $m_{cs} = 0$ | $m_{cs} = 3$ | $m_{cs} = 6$ | $m_{cs} = 9$ |

TABLE 6

|  | HARQ-ACK information | |
| --- | --- | --- |
|  | 0 | 1 |
| Cyclic shift | $m_{cs} = 0$ | $m_{cs} = 9$ |

TABLE 7

|  | HARQ-ACK information | | | |
| --- | --- | --- | --- | --- |
|  | {0, 0} | {0, 1} | {1, 1} | {1, 0} |
| Cyclic shift | $m_{cs} = 0$ | $m_{cs} = 3$ | $m_{cs} = 6$ | $m_{cs} = 9$ | wherein 1 indicates that the HARQ-ACK information is an ACK, and wherein 0 indicates that the HARQ-ACK information is a NACK.

14. The method according to claim 13, wherein before the receiving, by a network device, an uplink signal, the method comprises:
   sending, by the network device, indication information to the terminal device, wherein the indication information indicates that the mapping relationship is the mapping relationship 1 or the mapping relationship 2.

15. A communications device, comprising:
   a transmitter;
   a processor; and
   a non-transitory computer readable medium comprising a program stored thereon for execution by the processor, the program including instructions to:
      determine, according to hybrid automatic repeat request-acknowledgment (HARQ-ACK) information and a mapping relationship, a channel resource corresponding to the HARQ-ACK information, wherein a channel resource corresponding to an acknowledgement (ACK) and a channel resource corresponding to {ACK, negative acknowledgement (NACK)} in the mapping relationship are the same, wherein the ACK is associated with the communications device detecting one physical downlink control channel (PDCCH) of a first PDCCH and a second PDCCH sent by a network device, and is further associated with the communications device not detecting another one of the first PDCCH and the second PDCCH, and wherein the {ACK, NACK} is associated with the communications device detecting both the first PDCCH and the second PDCCH;
      generate an uplink signal based on the channel resource corresponding to the HARQ-ACK information; and
      cause the transmitter to send the uplink signal.

16. The device according to claim 15, wherein the channel resource in the mapping relationship comprises at least a first physical uplink control channel (PUCCH) resource and a second PUCCH resource;
   wherein the mapping relationship comprises the ACK corresponding to the second PUCCH resource, and the {ACK, NACK} corresponding to the second PUCCH resource; and
   wherein the program further includes instructions to perform at least one of:
      determine, in response to the HARQ-ACK information being the ACK, according to the ACK and the mapping relationship, that the channel resource corresponding to the ACK is the second PUCCH resource; or
      determine, in response to the HARQ-ACK information being the {ACK, NACK}, according to the {ACK, NACK} and the mapping relationship, that the channel resource corresponding to the {ACK, NACK} is the second PUCCH resource.

17. The device according to claim 15, wherein the channel resource in the mapping relationship comprises at least a first scheduling request (SR) physical uplink control channel (PUCCH) resource, a second SR PUCCH resource, a first PUCCH, and a second PUCCH;
   wherein the mapping relationship comprises the ACK corresponding to the second SR PUCCH resource and the {ACK, NACK} corresponding to the second SR PUCCH resource when an SR transmission status is a positive SR transmission, and further comprises the ACK corresponding to the second PUCCH resource and the {ACK, NACK} corresponding to the second PUCCH resource when the SR transmission status is a negative SR transmission; and wherein the program further includes instructions to perform at least one of:
- determine, in response to the HARQ-ACK information being the ACK and the SR transmission status being the positive SR transmission, and according to the mapping relationship, that the channel resource corresponding to the ACK is the second SR PUCCH resource;
- determine, in response to the HARQ-ACK information being the {ACK, NACK} and the SR transmission status being the positive SR transmission, and according to the mapping relationship, that the channel resource corresponding to the {ACK, NACK} is the second SR PUCCH resource;
- determine, in response to the HARQ-ACK information being the ACK and the SR transmission status being the negative SR transmission, and according to the mapping relationship, that the channel resource corresponding to the ACK is the second PUCCH resource; or
- determine, in response to the HARQ-ACK information being the {ACK, NACK} and the SR transmission status being the negative SR transmission, and according to the mapping relationship, that the channel resource corresponding to the {ACK, NACK} is the second PUCCH resource.

18. The device according to claim 17, wherein the mapping relationship meets Table 1 to Table 3, and wherein Tables 1-3 comprise:

TABLE 1

| sPUCCH format | HARQ-ACK information | PUCCH resource |
|---|---|---|
| 1a | 0 | First PUCCH resource |
|  | 1 | Second PUCCH resource |
| 1b | 00 | First PUCCH resource |
|  | 10 | Second PUCCH resource |
|  | 01 | Third PUCCH resource |
|  | 11 | Fourth PUCCH resource | wherein 1 indicates that the HARQ-ACK information is an ACK, and wherein 0 indicates that the HARQ-ACK information is a NACK;

TABLE 2

| HARQ-ACK information | SR transmission status | PUCCH resource |
|---|---|---|
| ACK/NACK | Negative | PUCCH resource corresponding to the sPUCCH format 1a in Table 1 |
| NACK | Positive | First SR PUCCH resource |
| ACK | Positive | Second SR PUCCH resource |

TABLE 3

| HARQ-ACK information (0) | HARQ-ACK information (1) | SR transmission status | PUCCH resource |
|---|---|---|---|
| ACK/NACK | ACK/NACK | Negative | PUCCH resource corresponding to the sPUCCH format 1b in Table 1 |

TABLE 3-continued

| HARQ-ACK information (0) | HARQ-ACK information (1) | SR transmission status | PUCCH resource |
|---|---|---|---|
| NACK | NACK | Positive | First SR PUCCH resource |
| ACK | NACK | Positive | Second SR PUCCH resource |
| NACK | ACK | Positive | Third SR PUCCH resource |
| ACK | ACK | Positive | Fourth SR PUCCH resource | wherein the correspondence between the HARQ-ACK information and the channel resource meets Table 1 when the SR transmission status is the negative SR transmission; and wherein the correspondence between the HARQ-ACK information and the channel resource meets Table 2 and Table 3 when the SR transmission status is the positive SR transmission.

19. The device according to claim 15, wherein the channel resource corresponding to the HARQ-ACK information is a cyclic shift corresponding to the HARQ-ACK information, and wherein cyclic shifts in the mapping relationship comprise at least a first cyclic shift and a second cyclic shift;

wherein the mapping relationship comprises the ACK corresponding to the second cyclic shift, and the {ACK, NACK} corresponding to the second cyclic shift; and wherein the program further includes instructions to perform at least one of:
- determine, in response to the HARQ-ACK information being the ACK, and according to the mapping relationship, that a cyclic shift corresponding to the ACK is the second cyclic shift; or
- determine, in response to the HARQ-ACK information being the {ACK, NACK}, and according to the mapping relationship, that a cyclic shift corresponding to the {ACK, NACK} is the second cyclic shift.

20. The device according to claim 19, wherein the mapping relationship is a mapping relationship 1 or a mapping relationship 2, wherein the mapping relationship 1 meets Table 4 and Table 5, wherein the mapping relationship 2 meets Table 6 and Table 7, and wherein Tables 4-7 comprise:

TABLE 4

|  | HARQ-ACK information | |
|---|---|---|
|  | 0 | 1 |
| Cyclic shift | $m_{cs} = 0$ | $m_{cs} = 6$ |

TABLE 5

|  | HARQ-ACK information | | | |
|---|---|---|---|---|
|  | {0, 0} | {0, 1} | {1, 0} | {1, 1} |
| Cyclic shift | $m_{cs} = 0$ | $m_{cs} = 3$ | $m_{cs} = 6$ | $m_{cs} = 9$ |

TABLE 6

| | HARQ-ACK information | |
|---|---|---|
| | 0 | 1 |
| Cyclic shift | $m_{cs} = 0$ | $m_{cs} = 9$ |

TABLE 7

| | HARQ-ACK information | | | |
|---|---|---|---|---|
| | {0, 0} | {0, 1} | {1, 1} | {1, 0} |
| Cyclic shift | $m_{cs} = 0$ | $m_{cs} = 3$ | $m_{cs} = 6$ | $m_{cs} = 9$ | wherein 1 indicates that the HARQ-ACK information is an ACK, and wherein 0 indicates that the HARQ-ACK information is a NACK.

* * * * *